US009762060B2

(12) United States Patent
Kalsi et al.

(10) Patent No.: US 9,762,060 B2
(45) Date of Patent: Sep. 12, 2017

(54) DISTRIBUTED HIERARCHICAL CONTROL ARCHITECTURE FOR INTEGRATING SMART GRID ASSETS DURING NORMAL AND DISRUPTED OPERATIONS

(71) Applicant: Battelle Memorial Institute, Richland, WA (US)

(72) Inventors: Karan Kalsi, Richland, WA (US); Jason C. Fuller, Richland, WA (US); Abhishek Somani, Richland, WA (US); Robert G. Pratt, Kennewick, WA (US); David P. Chassin, Pasco, WA (US); Donald J. Hammerstrom, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 772 days.

(21) Appl. No.: 14/145,742

(22) Filed: Dec. 31, 2013

(65) Prior Publication Data

US 2014/0188689 A1    Jul. 3, 2014

Related U.S. Application Data

(60) Provisional application No. 61/748,059, filed on Dec. 31, 2012.

(51) Int. Cl.
*G06F 19/00* (2011.01)
*H02J 3/16* (2006.01)
(Continued)

(52) U.S. Cl.
CPC .......... *H02J 3/16* (2013.01); *G05F 5/00* (2013.01); *H02J 3/00* (2013.01)

(58) Field of Classification Search
CPC ...... H02J 3/00; H02J 3/16; G05F 5/00; G06Q 40/04; Y04S 10/58
See application file for complete search history.

(56) References Cited

U.S. PATENT DOCUMENTS

| 2,042,187 | A | * | 5/1936 | Powers | ................ H02H 3/425 361/60 |
| 4,010,614 | A | | 3/1977 | Arthur | |
| 4,482,814 | A | * | 11/1984 | Daniels | ................ F01K 13/02 290/40 B |
| 5,572,438 | A | | 11/1996 | Ehlers et al. | |
| 5,684,710 | A | | 11/1997 | Ehlers et al. | |
| 5,696,695 | A | | 12/1997 | Ehlers et al. | |
| 5,924,486 | A | | 7/1999 | Ehlers et al. | |

(Continued)

FOREIGN PATENT DOCUMENTS

| CA | 2678828 | 3/2010 |
| JP | 2008-204073 | 9/2008 |
| WO | WO 99/01822 | 1/1999 |
| WO | WO 02/23693 | 3/2002 |
| WO | WO 2007/065135 | 6/2007 |

OTHER PUBLICATIONS

ANSI/CEA Standard, "Modular Communications Interface for Energy Management," ANSI/CEA-2045, ISO/IEC JTC 1/SC 25 N2152, 98 pp. (Feb. 2013).

(Continued)

*Primary Examiner* — Michael D Masinick
(74) *Attorney, Agent, or Firm* — Klarquist Sparkman, LLP

(57) ABSTRACT

Disclosed herein are representative embodiments of methods, apparatus, and systems for facilitating operation and control of a resource distribution system (such as a power grid). Among the disclosed embodiments is a distributed hierarchical control architecture (DHCA) that enables smart grid assets to effectively contribute to grid operations in a controllable manner, while helping to ensure system stability and equitably rewarding their contribution. Embodiments of the disclosed architecture can help unify the dispatch of these resources to provide both market-based and balancing services.

17 Claims, 7 Drawing Sheets

(51) Int. Cl.
*H02J 3/00* (2006.01)
*G05F 5/00* (2006.01)

(56) References Cited

U.S. PATENT DOCUMENTS

| | | | |
|---|---|---|---|
| 6,021,402 A | 2/2000 | Takriti |
| 6,216,956 B1 | 4/2001 | Ehlers et al. |
| 6,343,277 B1 | 1/2002 | Gaus et al. |
| 6,633,823 B2 | 10/2003 | Bartone et al. |
| 6,681,156 B1 | 1/2004 | Weiss |
| 6,895,325 B1 | 5/2005 | Munson, Jr. |
| 6,963,854 B1 | 11/2005 | Boyd et al. |
| 7,043,380 B2 | 5/2006 | Rodenberg et al. |
| 7,085,739 B1 | 8/2006 | Winter et al. |
| 7,130,719 B2 | 10/2006 | Ehlers et al. |
| 7,135,956 B2 | 11/2006 | Bartone et al. |
| 7,141,321 B2 | 11/2006 | McArthur et al. |
| 7,243,044 B2 | 7/2007 | McCalla |
| 7,249,169 B2 | 7/2007 | Blouin et al. |
| 7,343,226 B2 | 3/2008 | Ehlers et al. |
| 7,343,360 B1 | 3/2008 | Ristanovic et al. |
| 7,379,997 B2 | 5/2008 | Ehlers et al. |
| 7,418,428 B2 | 8/2008 | Ehlers et al. |
| 7,516,106 B2 | 4/2009 | Ehlers et al. |
| 7,587,330 B1 | 9/2009 | Shan |
| 7,599,866 B2 | 10/2009 | Yan et al. |
| 7,716,101 B2 | 5/2010 | Sandholm et al. |
| 7,953,519 B2 | 5/2011 | Hamilton, II et al. |
| 7,996,296 B2 | 8/2011 | Lange |
| 8,126,794 B2 | 2/2012 | Lange et al. |
| 8,271,345 B1 | 9/2012 | Milgrom et al. |
| 8,504,463 B2 | 8/2013 | Johnson et al. |
| 8,527,389 B2 | 9/2013 | Johnson et al. |
| 8,577,778 B2 | 11/2013 | Lange et al. |
| 8,639,392 B2 | 1/2014 | Chassin |
| 2001/0032029 A1 | 10/2001 | Kauffman |
| 2002/0038279 A1 | 3/2002 | Samuelson et al. |
| 2002/0091626 A1 | 7/2002 | Johnson et al. |
| 2002/0128747 A1 | 9/2002 | Mima |
| 2002/0132144 A1 | 9/2002 | McArthur et al. |
| 2002/0178047 A1 | 11/2002 | Or et al. |
| 2003/0014379 A1 | 1/2003 | Saias et al. |
| 2003/0023540 A2 | 1/2003 | Johnson et al. |
| 2003/0036820 A1 | 2/2003 | Yellepeddy et al. |
| 2003/0040844 A1 | 2/2003 | Spool et al. |
| 2003/0040845 A1 | 2/2003 | Spool et al. |
| 2003/0041002 A1 | 2/2003 | Hao et al. |
| 2003/0041016 A1 | 2/2003 | Spool et al. |
| 2003/0041017 A1 | 2/2003 | Spool et al. |
| 2003/0055774 A1 | 3/2003 | Ginsberg |
| 2003/0078797 A1 | 4/2003 | Kanbara et al. |
| 2003/0093332 A1 | 5/2003 | Spool et al. |
| 2003/0093357 A1 | 5/2003 | Guler et al. |
| 2003/0139939 A1 | 7/2003 | Spool et al. |
| 2003/0144864 A1 | 7/2003 | Mazzarella |
| 2003/0149672 A1 | 8/2003 | Laskoski |
| 2003/0216971 A1 | 11/2003 | Sick et al. |
| 2004/0010478 A1 | 1/2004 | Peljto et al. |
| 2004/0015428 A2 | 1/2004 | Johnson et al. |
| 2004/0024483 A1 | 2/2004 | Holcombe |
| 2004/0128266 A1 | 7/2004 | Yellepeddy et al. |
| 2004/0133529 A1 | 7/2004 | Munster |
| 2004/0140908 A1 | 7/2004 | Gladwin et al. |
| 2004/0153330 A1 | 8/2004 | Miller et al. |
| 2004/0254688 A1 | 12/2004 | Chassin et al. |
| 2005/0015283 A1 | 1/2005 | Iino et al. |
| 2005/0027636 A1 | 2/2005 | Gilbert et al. |
| 2005/0065867 A1 | 3/2005 | Aisu et al. |
| 2005/0114255 A1 | 5/2005 | Shields et al. |
| 2005/0125243 A1 | 6/2005 | Villalobos |
| 2005/0137959 A1 | 6/2005 | Yan et al. |
| 2005/0197875 A1 | 9/2005 | Kauffman |
| 2005/0228553 A1 | 10/2005 | Tryon |
| 2006/0036357 A1 | 2/2006 | Isono et al. |
| 2006/0241951 A1 | 10/2006 | Cynamom et al. |
| 2006/0259199 A1 | 11/2006 | Gjerde et al. |
| 2006/0293980 A1 | 12/2006 | Corby et al. |
| 2007/0011080 A1 | 1/2007 | Jain et al. |
| 2007/0038335 A1* | 2/2007 | McIntyre ............ H02J 3/00 700/295 |
| 2007/0061248 A1 | 3/2007 | Shavit et al. |
| 2007/0087756 A1 | 4/2007 | Hoffberg |
| 2007/0124026 A1 | 5/2007 | Troxell et al. |
| 2008/0021628 A1 | 1/2008 | Tryon |
| 2008/0027639 A1 | 1/2008 | Tryon |
| 2008/0039980 A1 | 2/2008 | Pollack et al. |
| 2008/0046387 A1 | 2/2008 | Gopal et al. |
| 2008/0051977 A1 | 2/2008 | Tryon |
| 2008/0243664 A1 | 10/2008 | Shavit et al. |
| 2008/0243682 A1 | 10/2008 | Shavit et al. |
| 2008/0243719 A1 | 10/2008 | Shavit et al. |
| 2008/0281663 A1 | 11/2008 | Hakim |
| 2008/0297113 A1 | 12/2008 | Saeki et al. |
| 2008/0300907 A1 | 12/2008 | Musier et al. |
| 2008/0300935 A1 | 12/2008 | Musier et al. |
| 2008/0306801 A1 | 12/2008 | Musier et al. |
| 2008/0319893 A1 | 12/2008 | Mashinsky et al. |
| 2009/0063228 A1 | 3/2009 | Forbes |
| 2009/0132360 A1 | 5/2009 | Arfin et al. |
| 2009/0177591 A1 | 7/2009 | Thorpe et al. |
| 2009/0195349 A1 | 8/2009 | Frader-Thompson et al. |
| 2009/0228151 A1 | 9/2009 | Wang et al. |
| 2009/0307059 A1 | 12/2009 | Young et al. |
| 2009/0313174 A1 | 12/2009 | Hafner et al. |
| 2009/0319090 A1 | 12/2009 | Dillon et al. |
| 2010/0010939 A1 | 1/2010 | Arfin et al. |
| 2010/0049371 A1 | 2/2010 | Martin |
| 2010/0057625 A1 | 3/2010 | Boss et al. |
| 2010/0106332 A1 | 4/2010 | Chassin et al. |
| 2010/0106641 A1 | 4/2010 | Chassin et al. |
| 2010/0107173 A1 | 4/2010 | Chassin |
| 2010/0114387 A1 | 5/2010 | Chassin |
| 2010/0121700 A1 | 5/2010 | Wigder et al. |
| 2010/0138363 A1 | 6/2010 | Batterberry et al. |
| 2010/0179704 A1 | 7/2010 | Ozog |
| 2010/0179862 A1 | 7/2010 | Pratt et al. |
| 2010/0216545 A1 | 8/2010 | Lange et al. |
| 2010/0217550 A1 | 8/2010 | Crabtree et al. |
| 2010/0218108 A1 | 8/2010 | Crabtree et al. |
| 2010/0256999 A1 | 10/2010 | Ghani et al. |
| 2010/0332373 A1 | 12/2010 | Crabtree et al. |
| 2011/0015801 A1 | 1/2011 | Mazzarella |
| 2011/0016055 A1 | 1/2011 | Mazzarella |
| 2011/0081955 A1 | 4/2011 | Lange et al. |
| 2011/0301964 A1 | 12/2011 | Conwell |
| 2011/0316480 A1* | 12/2011 | Mills-Price ............ H02J 3/1821 320/109 |
| 2012/0022995 A1 | 1/2012 | Lange |
| 2012/0083930 A1 | 4/2012 | Ilic et al. |
| 2012/0278220 A1* | 11/2012 | Chassin ............ G06Q 40/00 705/37 |
| 2013/0110304 A1* | 5/2013 | Shiga ............ H02J 3/14 700/295 |
| 2013/0268131 A1* | 10/2013 | Venayagamoorthy .... G05F 5/00 700/286 |
| 2013/0325691 A1 | 12/2013 | Chassin et al. |
| 2013/0325692 A1 | 12/2013 | Chassin et al. |
| 2014/0172503 A1 | 6/2014 | Hammerstrom et al. |
| 2014/0188689 A1* | 7/2014 | Kalsi ............ G06Q 40/04 705/37 |
| 2015/0379542 A1 | 12/2015 | Lian et al. |
| 2016/0248260 A1* | 8/2016 | Kulyk ............ H02J 3/38 |

OTHER PUBLICATIONS

Bergen et al., "A Structure Preserving Model for Power System Stability Analysis," *IEEE Trans. On Power Apparatus and Systems*, pp. 25-35 (Jan. 1981).

Boch, "PJM Interconnection OPENADR 2.0 Advanced Technology Resource Pilot," 5 pp. (Dec. 2014).

Brooks et al., "Demand Dispatch," *IEEE Power and Energy Magazine*, vol. 8, No. 3, pp. 20-29 (May 2010).

(56) References Cited

OTHER PUBLICATIONS

Callaway et al., "Achieving Controllability of Electric Loads," *Proc. IEEE*, vol. 99, No. 1, pp. 184-199 (Jan. 2011).
Callaway, "Tapping the Energy Storage Potential in Electric Loads to Deliver Load Following and Regulation, with Application to Wind Energy," *Energy Conversion and Management*, vol. 50, No. 5, pp. 1389-1400 (May 2009).
Chao, "Price-Responsive Demand Management for a Smart Grid World," *Electr. J.*, vol. 23, No. 1, pp. 7-20 (2010).
Chassin et al., "Load Modeling and Calibration Techniques for Power System Studies," *North American Power Symp.*, 7 pp. (Aug. 2011).
Chow et al., "A Toolbox for Power System Dynamics and Control Engineering Education and Research," *IEEE Trans. On Power Systems*, vol. 7, No. 4, pp. 1559-1564 (Nov. 1992).
Chow et al., "Power System Toolbox, Version 3.0," 123 pp. (2008).
Daily et al., "Framework for Network Co-Simulation," *Workshop on Next-Generation Analytics for the Future Power Grid*, PowerPoint presentation, 20 pp. (Jul. 2014).
Diao et al., "Electric Water Heater Modeling and Control Strategies for Demand Response," *Power and Energy Society General Meeting*, 8 pp. (Jul. 2012).
Donnelly et al., "Autonomous Demand Response for Primary Frequency Regulation," PNNL-21152, 69 pp. (Jan. 2012).
Dorfler et al., "Synchronization in Complex Oscillator Networks: A Survey," *Automatica*, vol. 50, No. 6, pp. 1539-1564 (Jun. 2014).
Electric Power Research Institute, "IntelliGrid—Program 161," *2014 Research Portfolio*, 23 pp. (downloaded Dec. 2014).
Electric Reliability Council of Texas, Inc., "Glossary," 59 pp. (document not dated—downloaded on Jul. 10, 2015).
Ellison et al., "Project Report: A Survey of Operating Reserve Markets in U.S. ISO/RTO-managed Electric Energy Regions," SAND2012-1000, Sandia National Laboratories, 44 pp. (Sep. 2012).
Energy Star, "Energy Star® Program Requirements—Product Specification for Residential Refrigerators and Freezers, Eligibility Criteria," Version 5.0, 10 pp. (Sep. 2014).
Fuller et al., "Analysis of Residential Demand Response and Double-Auction Markets," *IEEE Power and Energy Society General Meeting*, 7 pp. (Jul. 2011).
Fuller et al., "Communication Simulations for Power System Applications," *Modeling and Simulation of Cyber-Physical Energy Systems Workshop*, 6 pp. (May 2013).
Fuller et al., "Evaluation of Representative Smart Grid Investment Grant Project Technologies: Demand Response," PNNL-20772, 349 pp. (Feb. 2012).
Fuller et al., "Modeling of GE Appliances: Cost Benefit Study of Smart Appliances in Wholesale Energy, Frequency Regulation, and Spinning Reserve Markets," PNNL-22128, 64 pp. (Dec. 2012).
GE Energy Consulting, "PSLF—Get It Done Faster with PSLF!," downloaded from the World Wide Web, 2 pp. (2013).
Goldberg et al., "Measurement and Verification for Demand Response," 123 pp. (Feb. 2013).
Hammerstrom et al., "Pacific Northwest GridWise™ Testbed Demonstration Projects—Part I. Olympic Peninsula Project," PNNL-17167, 157 pp. (Oct. 2007).
Hammerstrom et al., "Pacific Northwest GridWise Testbed Demonstration Projects: Part II. Grid Friendly Appliance Project," Pacific Northwest National Laboratory PNNL-17079, 123 pp. (Oct. 2007).
Hao et al., "How Demand Response from Commercial Buildings Will Provide the Regulation Needs of the Grid," *50th Annual Allerton Conf.*, 6 pp. (Oct. 2012).
Hill et al., "Stability Analysis of Multimachine Power Networks with Linear Frequency Dependent Loads," *IEEE Trans. On Circuits and Systems*, vol. 29, No. 12, pp. 840-848 (Dec. 1982).
Holmes, "Using AMI Data for DR M&V Webcast," EPRI Powerpoint presentation, 21 pp. (May 2013).
Kalsi et al., "Distributed Smart Grid Asset Control Strategies for Providing Ancillary Services," PNNL-22875, 46 pp. (Sep. 2013).
Kalsi et al., "Loads as a Resource: Frequency Responsive Demand," PNNL SA-23764, 49 pp. (Sep. 2014).
Koch et al., "Modeling and Control of Aggregated Heterogeneous Thermostatically Controlled Loads for Ancillary Services," *Proc. Power Systems Computation Conference*, 8 pp. (Aug. 2011).
Kundu et al., "Modeling and Control of Thermostatically Controlled Loads," *Power Systems Computation Conference*, 7 pp. (Aug. 2011).
Lian et al., "Distributed Hierarchical Control of Multi-area Power Systems with Improved Primary Frequency Regulation," *IEEE Annual Conf. on Decision and Control*, pp. 444-449 (Dec. 2012).
Lu et al., "Design Considerations for Frequency Responsive Grid Friendly Appliances," *IEEE/PES Transmission and Distribution Conf. and Exhibit*, pp. 647-652 (May 2006).
Lu et al., "Grid Friendly Device Model Development and Simulation," PNNL-18998, 52 pp. (Nov. 2009).
Marinovici et al., "Distributed Hierarchical Control Architecture for Transient Dynamics Improvement in Power Systems," *IEEE Trans. On Power Systems*, vol. 28, No. 3, pp. 3065-3074 (2013).
Mathieu et al., "State Estimation and Control of Electric Loads to Manage Real-Time Energy Imbalance," *IEEE Trans. on Power Systems*, vol. 28, No. 1, pp. 430-440 (Feb. 2013).
Molina-Garcia et al., "Decentralized Demand-side Contribution to Primary Frequency Control," *IEEE Trans. On Power Systems*, vol. 26, No. 1, pp. 411-419 (2011).
Moya et al., "A Hierarchical Framework for Demand-Side Frequency Control," *American Control Conference*, pp. 52-57 (Jun. 2014).
Moya et al., "A Hierarchical Framework for Demand-Side Frequency Control," *American Control Conference*, PowerPoint presentation, 65 pp. (Jun. 2014).
Ns-3 Network Simulator, ns-3 Manual, Release ns-3.16, 126 pp. (Dec. 2012).
Pacific Northwest National Laboratory, "GridLAB-D—A Unique Tool to Design the Smart Grid," PNNL-SA-92325, 4 pp. (Nov. 2012).
PJM Interconnection, "Description of Regulation Signals," downloaded from the World Wide Web, 1 p. (document not dated—downloaded on Jul. 14, 2015).
PJM Interconnection, "Markets & Operations," downloaded from the World Wide Web, 3 pp. (document not dated—downloaded on Jul. 14, 2015).
PJM Interconnection, Regulation Performance Senior Task Force, "Performance Based Regulation: Year One Analysis," 22 pp. (Oct. 2013).
Power World Corporation, "Simulator Version 14, User's Guide," 1517 pp. (2009).
Shu et al., "Dynamic Incentive Strategy for Voluntary Demand Response Based on TDP Scheme," *Proc. IEEE Asia-Pacific Signal & Information Processing Association Annual Summit Conf.*, 6 pp. (Dec. 2012).
Siemens, "Power Transmission System Planning Software," downloaded from the World Wide Web, 8 pp. (downloaded on Oct. 27, 2016).
Siljak et al., "Robust Decentralized Turbine/Governor Control Using Linear Matrix Inequalities," *IEEE Trans. On Power Systems*, vol. 17, No. 3, pp. 715-722 (Aug. 2002).
Siljak et al., "Robust Stabilization of Nonlinear Systems: The Lmi Approach," *Mathematical Problems in Engineering*, vol. 6, No. 5, pp. 461-493 (Jun. 2000).
Subbarao et al., "Transactive Control and Coordination of Distributed Assets for Ancillary Services," PNNL-22942, 56 pp. (Sep. 2013).
Trudnowski et al., "Overview of Algorithms for Estimating Swing Modes from Measured Responses," *Power Energy Society General Meeting*, 8 pp. (Jul. 2009).
Varaiya et al., "Direct Methods for Transient Stability Analysis of Power Systems: Recent Results," *Proc. IEEE*, vol. 73, No. 12, pp. 1703-1715 (1985).
Widergren et al., "AEP Ohio gridSMART® Demonstration Project: Real-Time Pricing Demonstration Analysis," PNNL-23192, 92 pp. (Feb. 2014).

(56) References Cited

OTHER PUBLICATIONS

Widergren et al., "Residential Real-time Price Response Simulation," *IEEE Power and Energy Society General Meeting*, pp. 3074-3078 (Jul. 2011).
Wikipedia, "Spec:Market—Market Module Overview," downloaded from the World Wide Web, 19 pp. (last modified Jan. 2013).
Zhang et al., "Aggregated Modeling and Control of Air Conditioning Loads for Demand Response," *IEEE Trans. On Power Systems*, vol. 28, No. 4, pp. 4655-4664 (Nov. 2013).
Zhao et al., "Fast Load Control with Stochastic Frequency Measurement," *IEEE Power and Energy Society General Meeting*, 8 pp. (2012).
Zhao et al., "Frequency-based Load Control in Power Systems," *American Control Conf.*, pp. 4423-4430 (2012).
Zhao et al., "Swing Dynamics as Primal-dual Algorithm for Optimal Load Control," *IEEE Int'l Conf. on Smart Grid Comm.*, pp. 570-575 (2012).
Zimmerman et al., "A 'SuperOPF' Framework," *FERC Technical Conf. on Enhanced Optimal Power Flow Models*, PowerPoint presentation, 39 pp. (Jun. 2010).
Borenstein et al., "Diagnosing Market Power in California's Deregulated Wholesale Electricity Market," University of California Energy Institute, POWER, PWP-064, 54 pp. (Aug. 2000).
Borenstein et al., "Diagnosing Market Power in California's Deregulated Wholesale Electricity Market," University of California Energy Institute, POWER, PWP-064, 52 pp. (Mar. 2000).
Boyd et al., "Load Reduction, Demand Response, and Energy Efficient Technologies and Strategies," Pacific Northwest National Laboratory PNNL-18111, 44 pp. (Nov. 2008).
Brambley, "Thinking Ahead: Autonomic Buildings," *ACEEE Summer Study on the Energy Efficiency in Buildings*, vol. 7, pp. 73-86 (2002).
Chandley, "How RTOs Set Spot Market Prices (And How It Helps Keep the Lights On)," *PJM Interconnection*, 23 pp. (Sep. 2007).
Chassin et al., "Decentralized Coordination through Digital Technology, Dynamic Pricing, and Customer-Driven Control: The GridWise Testbed Demonstration Project," *The Electricity Journal*, vol. 21, pp. 51-59 (Oct. 2008).
Chassin et al., "Gauss-Seidel Accelerated: Implementing Flow Solvers on Field Programmable Gate Arrays," *IEEE Power Engineering Society General Meeting*, 5 pp. (Jun. 2006).
Chassin et al., "GridLAB-D: An Open-source Power Systems Modeling and Simulation Environment," *IEEE*, 5 pp. (Apr. 2008).
Chassin, "GridLAB-D Technical Support Document: Tape Modules Version 1.0," Pacific Northwest National Laboratory PNNL-17614, 8 pp. (May 2008).
Chassin, "GridLAB-D Technical Support Document: Commercial Modules Version 1.0," Pacific Northwest National Laboratory PNNL-17615, 8 pp. (May 2008).
Chassin, "GridLAB-D Technical Support Document: Network Module Version 1.0," Pacific Northwest National Laboratory PNNL-17616, 10 pp. (May 2008).
Chassin et al., "Modeling Power Systems as Complex Adaptive Systems," Pacific Northwest National Laboratory PNNL-14987, 151 pp. (Dec. 2004).
Chassin et al., "Project 2.6—Enhancement of the Whole-Building Diagnostician," Pacific Northwest National Laboratory PNNL-14383, 17 pp. (Aug. 2003).
Chassin, "The Abstract Machine Model for Transaction-based System Control," Pacific Northwest National Laboratory PNNL-14082, 28 pp. (Nov. 2002).
Chassin, "Statistical Mechanics: A Possible Model for Market-based Electric Power Control", *Proc. of the 37th Hawaii Int'l Conf. on System Sciences*, 10 pp. (Jan. 2004).
Chassin et al., "The Pacific Northwest Demand Response Market Demonstration," *IEEE*, 6 pp. (Jul. 2008).
Chen et al., "The Influence of Topology Changes on Inter-area Oscillation Modes and Mode Shapes," *IEEE Power and Energy Society General Meeting*, 7 pp. (Jul. 2011).
Clearwater et al., "Thermal Markets for Controlling Building Environments," *Energy Engineering*, vol. 91, No. 3, pp. 26-56 (1994).
Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).
Denton et al., "Spot Market Mechanism Design and Competitivity Issues in Electric Power," *Proc. of the 31st Hawaii International Conference on System Sciences*, vol. 3, pp. 48-56 (Jan. 1998).
Diao et al., "Deriving Optimal Operational Rules for Mitigating Inter-area Oscillations," *IEEE/PES Power Systems Conference & Exposition*, 8 pp. (Mar. 2011).
Fernandez et al., "Self Correcting HVAC Controls: Algorithms for Sensors and Dampers in Air-Handling Units," Pacific Northwest Laboratory PNNL-19104, 49 pp. (Dec. 2009).
Fuller et al., "Modeling of GE Appliances in GridLAB-D: Peak Demand Reduction," Pacific Northwest National Laboratory PNNL-21358, 157 pp. (Apr. 2012).
Gatterbauer, "Interdependencies of Electricity Market Characteristics and Bidding Strategies of Power Producers," Master's Thesis, Massachusetts Institute of Technology, 33 pp. (May 2002).
Georgilakis, "Market Clearing Price Forecasting in Deregulated Electricity Markets Using Adaptively Trained Neural Networks," *Hellenic Conference on Artificial Intelligence*, vol. 3955, pp. 56-66 (2006).
Gjerstad et al., "Price Formation in Double Auctions," *Games and Economic Behavior*, vol. 22, article No. GA970576, pp. 1-29 (1998). (Document marked as Received Nov. 30, 1995).
Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).
Gridwise Architecture Council, "Transactive Energy Workshop Proceedings," PNNL-SA-86105, 24 pp. (May 2011).
Guttromson et al., "Residential Energy Resource Models for Distribution Feeder Simulation," *IEEE*, vol. 1, pp. 108-113 (Jul. 2003).
Hammerstrom et al., "Standardization of a Hierarchical Transactive Control System," *Grid Interop Conf.*, 7 pp. (Nov. 2009).
Hammerstrom et al., "Standardization of a Hierarchical Transactive Control System," Grid Interop Conf., PowerPoint presentation slides, 19 pp. (Nov. 2009).
Hatley et al., "Energy Management and Control System: Desired Capabilities and Functionality," Pacific Northwest National Laboratory PNNL-15074, 46 pp. (Apr. 2005).
Hô et al., "Econophysical Dynamics of Market-Based Electric Power Distribution Systems," *IEEE*, pp. 1-6 (Jan. 2006).
Huang et al., "Analytics and Transactive Control Design for the Pacific Northwest Smart Grid Demonstration Project," *IEEE Int'l Conf. on Smart Grid Communications*, pp. 449-454 (Oct. 2010).
Huang et al., "MANGO—Modal Analysis for Grid Operation: A Method for Damping Improvement through Operating Point Adjustment," Pacific Northwest National Laboratory PNNL-19890, 92 pp. (Oct. 2010).
Huang et al., "Transforming Power Grid Operations," *Scientific Computing*, vol. 45, No. 5, pp. 22-27 (Apr. 2007).
Kannberg et al., "GridWise: The Benefits of a Transformed Energy System," Pacific Northwest National Laboratory PNNL-14396, 48 pp. (Sep. 2003).
Katipamula et al., "Evaluation of Residential HVAC Control Strategies for Demand Response Programs," *ASHRAE Trans., Symp. on Demand Response Strategies for Building Systems*, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kiesling, "Retail Electricity Deregulation: Prospects and Challenges for Dynamic Pricing and Enabling Technologies," The Searle Center Annual Review of Regulation, 44 pp. (May 2007).
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).

(56) References Cited

OTHER PUBLICATIONS

Kok et al., "Agent-based Electricity Balancing with Distributed Energy Resources, A Multiperspective Case Study," *Proc. Hawaii Int'l Conf. on System Sciences*, 10 pp. (Jan. 2008).
Kok et al., "PowerMatcher: Multiagent Control in the Electricity Infrastructure," *AAMAS*, 8 pp. (Jul. 2005).
LeMay et al., "An Integrated Architecture for Demand Response Communications and Control," *Hawaii Int'l Conf. on System Sciences*, 10 pp. (Jan. 2008).
Lu et al., "A State-Queueing Model of Thermostatically Controlled Appliances," *IEEE Trans. on Power Systems*, vol. 19, No. 3, pp. 1666-1673 (Aug. 2004).
Lu et al., "Control Strategies of Thermostatically Controlled Appliances in a Competitive Electricity Market," *IEEE Proc. Power Engineering Society General Meeting*, pp. 202-207 (Jun. 2005).
Lu et al., "Modeling Uncertainties in Aggregated Thermostatically Controlled Loads Using a State Queueing Model," *IEEE Trans. on Power Systems*, vol. 20, No. 2, pp. 725-733 (May 2005).
Lu et al., "Reputation-Aware Transaction Mechanisms in Grid Resource Market," *IEEE Sixth Int'l Conf. on Grid and Cooperative Computing*, 6 pp. (Aug. 2007).
Lu et al., "Simulating Price Responsive Distributed Resources," *IEEE*, vol. 3, pp. 1538-1543 (Oct. 2004).
Melton, "A Transactive Control Approach to Engaging Responsive Assets," Connectivity Week, PowerPoint presentation slides, 14 pp. (May 2010).
Melton et al., "Transactive Control: An Approach for Widespread Coordination of Responsive Smart Grid Assets," Pacitic Northwest Smart Grid Demonstration Project PowerPoint presentation slides, 19 pp. (May 2010).
Melton, "Transactive Control in Electricity Delivery," Grid-Interop 2010, Pacific Northwest Smart Grid Demonstration Project, PowerPoint presentation slides, 15 pp. (Nov. 2010).
Melton, "Using Transactive Control to Engage Distributed Energy Resources," Connectivity Week, PowerPoint presentation slides, 10 pp. (May 2011).
Nanduri et al., "A Methodology for Evaluating Auction Based Pricing Strategies in Deregulated Energy Markets," Working Paper, 12 pp. (2005).
Nanduri, et al., "A Reinforcement Learning Model to Assess Market Power Under Auction-Based Energy Pricing," *IEEE Trans. on Power Systems*, vol. 22, No. 1, pp. 85-95 (Feb. 2007).
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Plott et al., "Instability of Equilibria in Experimental Markets: Upward-sloping Demands, Externalities, and Fad-like Incentives," *Southern Economic Journal*, vol. 65 (3), 23 pp. (Jan. 1999).
Pourebrahimi et al., "Market-based Resource Allocation in Grids," *IEEE Int'l Conf. on e-Science and Grid Computing*, 8 pp. (2006).
Pratt et al., "Potential Impacts of High Penetration of Plug-in Hybrid Vehicles on the U.S. Power Grid," DOE/EERE PHEV Stakeholder Workshop, 14 pp. (Jun. 2007).
Satayapiwat et al., "A Utility-based Double Auction Mechanism for Efficient Grid Resource Allocation," *Int'l Symp. on Parallel and Distributed Processing with Applications* (ISPA '08), pp. 252-260 (Dec. 10-12, 2008).
Schneider et al., "A Taxonomy of North American Radial Distribution Feeders," *IEEE Power & Energy Society General Meeting*, 6 pp. (Jul. 2009).
Schneider et al., "Analysis of Distribution Level Residential Demand Response," *IEEE/PES Power System Conference and Exposition*, 6 pp. (Mar. 2011).
Schneider et al., "Detailed End Use Load Modeling for Distribution System Analysis," *IEEE Power and Energy Society General Meeting*, 7 pp. (Jul. 2010).
Schneider et al., "Distribution Power Flow for Smart Grid Technologies," *IEEE/PES Power System Conference and Exhibition*, 7 pp. (Mar. 2009).
Schneider et al., "Evaluation of Conservation Voltage Reduction (CVR) on a National Level," Pacific Northwest National Laboratory PNNL-19596, 114 pp. (Jul. 2010).
Schneider et al., "Modern Grid Strategy: Enhanced GridLAB-D Capabilities Final Report," Pacific Northwest National Laboratory PNNL-18864, 30 pp. (Sep. 2009).
Schneider et al., "Multi-State Load Models for Distribution System Analysis," *IEEE Trans. on Power Systems*, vol. 26, No. 4, pp. 2425-2433 (Nov. 2011).
Schneider et al., "Voltage Control Devices on the IEEE 8500 Node Test Feeder," *IEEE PES Transmission & Distribution Conference & Exposition*, 6 pp. (Apr. 2010).
Singh et al., "Effects of Distributed Energy Resources on Conservation Voltage Reduction (CVR)," *IEEE Power and Energy Society General Meeting*, 7 pp. (Jul. 2011).
Taylor et al., "GridLAB-D Technical Support Document: Residential End-Use Module Version 1.0," Pacific Northwest National Laboratory PNNL-17694, 30 pp. (Jul. 2008).
Yin et al., "A Novel Double Auction Mechanism for Electronic Commerce: Theory and Implementation," *IEEE Proc. of the Third Int'l Conf. on Machine Learning and Cybernetics*, pp. 53-58 (Aug. 2004).

\* cited by examiner

DISTRIBUTED HIERARCHICAL CONTROL ARCHITECTURE FOR INTEGRATING SMART GRID ASSETS DURING NORMAL AND DISRUPTED OPERATIONS

CROSS-REFERENCE TO RELATED APPLICATIONS

This application claims the benefit of U.S. Provisional Application 61/748,059 filed on Dec. 31, 2012, and entitled "DISTRIBUTED HIERARCHICAL CONTROL ARCHITECTURE FOR INTEGRATING SMART GRID ASSETS DURING NORMAL AND DISRUPTED OPERATIONS," which is hereby incorporated herein by reference in its entirety.

ACKNOWLEDGMENT OF GOVERNMENT SUPPORT

This invention was made with government support under DE-AC05-76RL01830 awarded by the U.S. Department of Energy. The government has certain rights in the invention.

FIELD

This application relates generally to the field of power grid management and control.

SUMMARY

Disclosed below are representative embodiments of methods, apparatus, and systems for facilitating operation and control of a resource distribution system (such as a power grid). Among the disclosed embodiments herein is a distributed hierarchical control architecture (DHCA) that enables smart grid assets to effectively contribute to grid operations in a controllable manner, while helping to ensure system stability and equitably rewarding their contribution. The architecture can help unify the dispatch of these resources to provide both market-based and balancing services. Means to dynamically select and arm the autonomous responses from these assets are also disclosed, enabling the assets to offer significant reliability benefits under the full range of grid operating conditions. Further, transmission-level controls can be integrated with new and existing distribution-level control strategies, within a market structure, under both normal and disrupted operations (e.g., disrupted communications and other unforeseen events).

In certain embodiments, for example, a transactive scheme is used to clear markets at multiple levels (e.g., at one or more of an electronic device level (such as at the level of smart grid assets), feeder level, area level, or system level (such as at the level of an independent system operator (ISO) or regional transmission organization (RTO))). Further, in some embodiments, the framework is designed for clearing markets at multiple temporal scales (e.g., the framework is designed for coordinating day-ahead and real-time energy market). Still further, in some embodiments, the framework is designed for integrating retail and wholesale energy markets.

In some embodiments, the architecture is further configured to provide ancillary or balancing services. For example, the architecture can comprise a nested hierarchical set of co-optimized energy and balancing markets. In operation, embodiments of the disclosed technology can be used to help ensure continued operations of the asset network under disrupted conditions (e.g., when communications are incomplete or unavailable) and during grid contingencies when distributed smart grid assets (DSGAs) may be useful elements of local- and wide-area recovery schemes.

In some example implementations, the overall hierarchical control architecture is divided into four levels: device, feeder, area, and system levels. The architecture can also integrate operations across multiple time scales: day-ahead (24-hr), real-time (~5-min), and near instantaneous (~sec) balancing requirements (e.g., regulation, spinning reserve, etc.). At the device level, decentralized control schemes allow distributed smart grid assets to provide both economic and reliability responses. The control schemes can be based, for example, on the self-sensing of frequency, voltage, broadcasts of the imbalance signal, current and future prices, and/or device conditions like state-of-charge (batteries) or temperature and setpoint (thermostats, smart appliances, etc.) during normal operation. The distributed smart grid assets can also be dynamically armed via centralized control signals (setpoints) while responding autonomously and instantaneously.

In some embodiments, a balancing supervisory area controller solves an area wide optimization problem, including bids and then allocates a portion of its requirements to the feeder controller. It also works to maintain adequate system-wide support in terms of frequency and tie-line flows. A balancing feeder controller then dispatches setpoints (e.g., ~sec to 1-min) to the distributed smart grid assets and primary devices to meet the requirements of the balancing area controller and the market-based feeder management system.

In certain embodiments, market-based feeder and area management systems aim to minimize or reduce total costs in the real-time and day-ahead markets by incorporating the smart grid resources into standard ISO/RTO market structures. This can be done, for example, by solving a large-scale optimization problem subject to local and area operational constraints and uncertainties of renewables and distributed smart grid assets. Demonstrations have been performed that showed how devices can bid their capabilities into local feeder-level markets in a transactive scheme that reflects both wholesale prices and capacity constraints. Embodiments of the disclosed technology can close the loop by affecting the price at the system or area levels. At the system level, for example, the ISOs and BAs receive aggregated net load demand, supply bids for smart grid assets from the real-time and day-ahead area management systems, and generator power supply offers from generator aggregators. In certain implementations, the cleared or scheduled power setpoints are then dispatched to the area controllers, which in turn dispatch requirements or price signals to the feeder controllers and distributed smart grid assets.

Embodiments of the disclosed technology can have a direct impact in the efficiency of generation and delivery of electric power, in the reduction of greenhouse gas emissions from the electric power system, and/or in ensuring that the U.S. maintains its leadership in developing and deploying advanced energy technologies. The disclosed technology can be used, for example, to effectively harness the potential of smart grid approaches to affect actual, moment-by-moment grid operations in very substantial ways. Embodiments of the disclosed technology overcome the balkanized approaches being pursued by various elements of the industry by providing a unified approach to obtaining increased benefits at multiple levels of the grid infrastructure from many types of distributed smart grid assets once they are purchased, whether they are owned by utilities, customers, or third parties. As such, embodiments of the disclosed technology can be used to form the basic, overarching architecture that can give focus to priority, minimal (as opposed to endlessly expansive) communications, and interoperability standards. Such a unified approach can significantly help realize the transformation envisioned by the smart grid.

Embodiments of the disclosed technology can help alleviate concerns of system planners and operators regarding controllability of distributed smart grid assets, allowing them to be fully incorporated into system operations to achieve multiple objectives. Among the possible benefits that can be realized by embodiments of the disclosed technology are one or more of the following:

Higher utilization of generation, transmission, and distribution assets, by reducing peak loads;

Lower wholesale market costs or power production costs, especially during high price periods, from DSGAs response to wholesale prices;

Lower ancillary service costs by engaging distributed assets to supply them; and/or Lower cost for integrating new solar and wind generation them into system operations by mitigating their variability and uncertainty.

Another impact that can be realized in embodiments of the disclosed technology is the increased reliability at both the bulk grid and distribution levels, from coordinating the engagement of distributed assets by multiple operating entities by:

Increasing available reserve margins;

Incorporating them into bulk grid wide-area control schemes; and

Integrating them with distribution level voltage control and reconfiguration schemes.

Embodiments of the disclosed technology can also increase the penetration of demand response and other distributed assets by allowing them to provide a complete set of services on par with traditional large-scale generation plants. The increased penetration of demand response and other distributed assets can also help to keep utility revenue requirements, and hence customer rates, as low as possible by utilizing lower cost distributed assets to displace the need for additional traditional infrastructure, thereby increasing the overall cost effectiveness of the grid infrastructure. By minimizing (or otherwise reducing) the information content of data transferred, embodiments of the distributed hierarchical control architecture can also enhance cyber-security and customer privacy.

Embodiments of the disclosed methods can be performed using computing hardware, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives or solid state drives (e.g., solid state drives based on flash memory)). Such software can be executed on a single computer or on a networked computer (e.g., via the Internet, a wide-area network, a local-area network, a client-server network, a cloud-based network, or other such network). Embodiments of the disclosed methods can also be performed by specialized computing hardware (e.g., one or more application specific integrated circuits (ASICs) or programmable logic devices (such as field programmable gate arrays (FPGAs)) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)) and are considered to be within the scope of this disclosure. Furthermore, any of the software embodiments (comprising, for example, computer-executable instructions which when executed by a computer cause the computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

DETAILED DESCRIPTION

I. General Considerations

Figure 1:
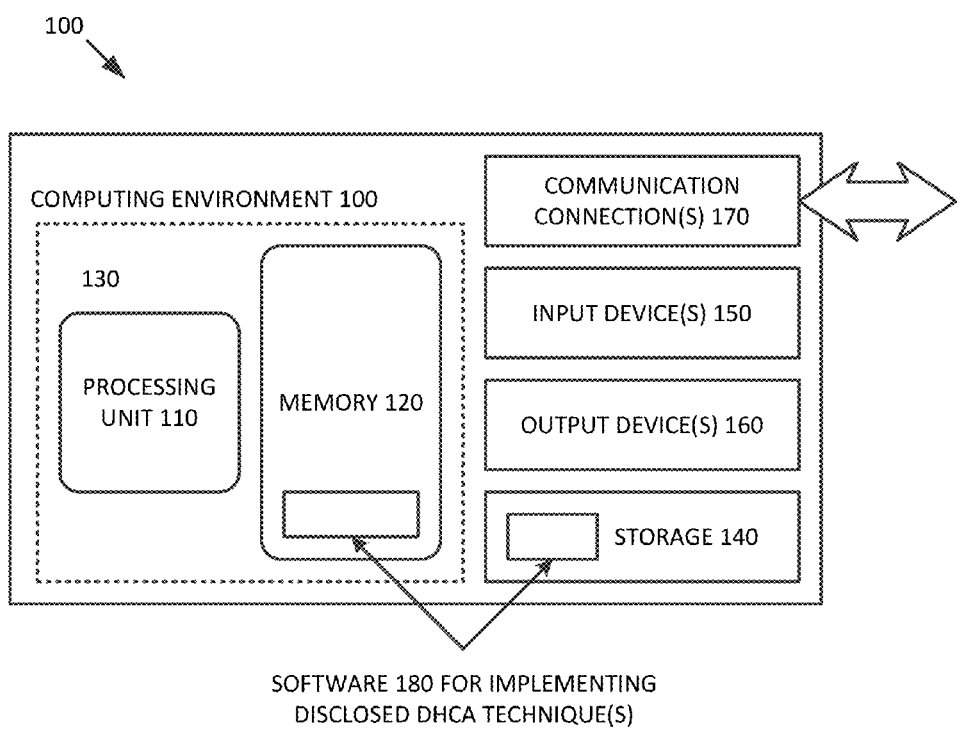
FIG. 1 is a block diagram illustrating an example computing hardware environment which can be used to implement embodiments of the disclosed technology.

Disclosed below are representative embodiments of methods, apparatus, and systems for facilitating operation and control of a resource distribution system (such as a power grid). The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any one or more features or aspects of the disclosed embodiments can be used alone or in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art. Furthermore, in general, and as used herein, the term "optimal" describes a solution that satisfies some set of criteria better than other solutions according to some parameterization or modeling, which may or may not be optimal in absolute terms depending on circumstances, and the term "optimize" or "optimization" is used to indicate the process of finding such a solution. Furthermore, as used herein, the term "and/or" means any one item or combination of items in the phrase.

Any of the embodiments disclosed herein can be used to with any of the transactive control schemes and architectures described in U.S. Nonprovisional application Ser. No. 12/587,008 filed on Sep. 29, 2009, and entitled "ELECTRIC POWER GRID CONTROL USING A MARKET-BASED RESOURCE ALLOCATION SYSTEM," (published as U.S. Patent Application Publication No. 2010/0114387); U.S. Nonprovisional application Ser. No. 12/686,243 filed on Jan. 12, 2010, and entitled "NESTED, HIERARCHICAL RESOURCE ALLOCATION SCHEMA FOR MANAGEMENT AND CONTROL OF AN ELECTRIC POWER GRID" (published as U.S. Patent Application Publication No. 2010/0179862); and U.S. Nonprovisional application Ser. No. 14/108,078 filed on Dec. 16, 2013, and entitled "TRANSACTIVE CONTROL AND COORDINATION FRAMEWORK AND ASSOCIATED TOOLKIT FUNCTIONS", all of which are hereby incorporated herein by reference in their entirety.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as hard drives)) and executed by a processor in a computing device (e.g., a computer, such as any commercially available computer). Any of the computer-executable instructions for implementing the disclosed techniques as well as any intermediate or final data created and used during implementation of the disclosed systems can be stored on one or more computer-readable media (e.g., non-transitory computer-readable media). The computer-executable instructions can be part of, for example, a dedicated software application or as part of a software agent's transport payload that is accessed or downloaded via a network (e.g., a local-area network, a wide-area network, a client-server network, or other such network).

Such software can be executed on a single computer (e.g., a computer embedded in or electrically coupled to a sensor, controller, or other device in the power grid) or in a network environment. For example, the software can be executed by a computer embedded in or communicatively coupled to a sensor for measuring electrical parameters of a power line, a synchrophasor sensor, a smart meter, a control unit for a home or household appliance or system (e.g., an air-conditioning unit; heating unit; heating, ventilation, and air conditioning (HVAC) system; hot water heater; refrigerator; dish washer; washing machine; dryer; oven; microwave oven; pump; home lighting system; electrical charger; electric vehicle charger; home electrical system; or any other electrical system having variable performance states), a control unit for a distributed generator (e.g., photovoltaic arrays, wind turbines, or electric battery charging systems), a control unit for controlling the distribution or generation of power along the power grid (e.g., a transformer, switch, circuit breaker, generator, resource provider, or any other device on the power grid configured to perform a control action), and the like. These household appliances and distributed generators (along with any associated control unit) are examples of the "electrical devices", "distributed smart grid assets", "DSGAs", "distributed assets", or "assets" discussed below. As more fully explained below, these devices can be controlled and coordinated in embodiments of the disclosed DHCA.

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, Python, JINI, .NET, Lua or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions which when executed by a computer cause the computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by a computing device comprising an integrated circuit (e.g., an application specific integrated circuit (ASIC) or programmable logic device (PLD), such as a field programmable gate array (FPGA)). The integrated circuit or specialized computing hardware can be embedded in or directly coupled to a sensor, control unit, or other device in the power grid. For example, the integrated circuit can be embedded in or otherwise coupled to a synchrophasor sensor, smart meter, control unit for a home or household appliance or system, a control unit for a distributed generator, a control unit for controlling power distribution on the grid, or other such device.

FIG. 1 illustrates a generalized example of a suitable computing hardware environment 100 for a computing device with which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described techniques for operating or using the disclosed systems. For example, the memory 120 can store software 180 for implementing any of the disclosed techniques.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible storage medium which can be used to store information in a non-transitory manner and which can be accessed within the computing environment 100. The storage 140 can also store instructions for the software 180 implementing any of the described techniques, systems, or environments.

The input device(s) 150 can be a touch input device such as a keyboard, mouse, touch screen, pen, or trackball, a voice input device, a scanning device, or another device that provides input to the computing environment 100. The output device(s) 160 can be a display, touch screen, printer, speaker, or another device that provides output from the computing environment 100.

The communication connection(s) 170 enable communication over a communication medium to another computing entity. The communication medium conveys information such as computer-executable instructions, an agent transport payload, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment and do not encompass transitory carrier waves. By way of example, and not limitation, with the computing environment 100, computer-readable media include tangible non-transitory computer-readable media, such as memory 120 and storage 140.

The various methods, systems, and interfaces disclosed herein can also be described in the general context of computer-executable instructions, such as those included in program modules, being executed in a computing environment on a target processor. Generally, program modules include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

As noted, the disclosed technology is implemented at least part using a network of computing devices (e.g., any of the computing device examples described above). The network can be implemented at least in part as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Furthermore, at least part of the network can be the Internet or a similar public network.

II. Introduction to the Disclosed Technology

Distributed generation, demand response, distributed storage, smart appliances, electric vehicles, and other emerging distributed smart grid assets are expected to play a key part in the transformation of the American power system. The nation has made a major investment in deploying smart grid technology via the smart grid investment grants (SGIG) and other utility projects, resulting in rapidly increasing penetration of distributed smart assets. With large-scale plans to integrate renewable generation driven mainly by state-level renewable portfolio requirements, more resources will be needed to compensate for the uncertainty and variability associated with intermittent generation resources. Distributed assets can be used to mitigate the concerns associated with renewable energy resources and to keep costs down. To date, however, the focus has been on obtaining these assets and demonstrating use in small pilot studies, rather than how they will be controlled, coordinated, and compensated when they are present in large numbers.

For example, some solutions for dispatching demand response are not integrated with those that will be used for distributed storage and generation, nor are they coordinated with the use of more traditional utility assets. The primary use of these assets has been for limiting peak demand, or responding to wholesale price spikes. Using these assets for this purpose is akin to buying a peaking power plant that is utilized only a few hours per year. Distributed assets have not been widely used to provide additional value streams such as managing capacity at the distribution level, responding to wholesale market fluctuations on a continuous basis, or fast-action regulation services. Not tapping in to their ability to provide these other valuable services limits their cost effectiveness, and therefore slows their penetration and long term viability.

Centralized command and control approaches that purport to "optimize" the use of these assets are sometimes proposed as the solution to this problem. However, such approaches are impractical because: (1) continuous optimization of the system with large numbers of distributed assets is computationally intractable; (2) they require large transfers of possibly sensitive grid and personal information; and (3) they require the optimizer to make tradeoffs between customer service and value of response that are best made locally at the device level. As a consequence of this desire to support centralized optimization, the path to develop interoperability standards for distributed assets is greatly complicated by the necessity to support the seamless transfer of such a large variety of information from many different types of systems and devices.

Many distributed assets can provide the same benefits to the grid, and therefore they will compete with each other for the opportunity to provide them. However, retail markets have not gone through a restructuring process similar to what has occurred at the wholesale level and, hence, a level playing field for distributed assets does not currently exist, presenting a need going forward. Currently, there is no unified theory or architecture for how to approach the distributed control problem for distributed assets, nor the requisite market mechanisms to coordinate and incentivize them. New technologies provide the potential for secure, lower-cost power, but lack the control architecture to make them effective.

Additionally, there is not an integrated simulation environment to develop, test, and validate the distributed assets and the control architecture, with the necessary fidelity to accurately model the physics of the grid in combination with models of wholesale markets.

Embodiments of the disclosed technology comprise distributed hierarchical control architectures that provides an equitable means for coordinating distributed assets to serve both economic and operational/balancing (reliability) objectives. In certain embodiments, the architecture uses a distributed control and decision making approach, called transactive control, to coordinate distributed assets, as opposed to centralized command and control or a price-responsive only approach. The premise of transactive-based control is that interactions between various components in a complex energy system can be controlled by negotiating immediate and contingent contracts (e.g., using transactive controllers) on a regular basis in lieu of, or in addition to, the conventional command and control. For example, an electrical device (e.g., a distributed smart grid asset) can be given the ability to negotiate deals with its peers, suppliers, and customers to maximize (or otherwise increase) revenues while minimizing (or otherwise reducing) costs. The transactive control paradigm can be implemented through design and integration of retail and wholesale energy markets, creating a feedback loop between the two. The framework can enable the flow of information between different (hierarchical) levels of the electrical system, and can be similar at every time scale (e.g., day-ahead or real-time markets). In addition to vertical information flow between the layers, the framework can allow information to flow across markets at different time scales—for instance, between day-ahead and real-time markets. Hence, bulk energy will be contracted in day-ahead markets, requiring transacting of residual quantities and remedial actions to be taken into account in real-time markets and balancing operations, respectively. Finally, embodiments of the disclosed technology can allow closer integration of energy markets and balancing operations at every time scale and across different levels of the electrical system. In general, embodiments of the disclosed technology provide a feedback mechanism between the distributed assets via the retail markets up to ISO/RTO-operated wholesale market, and across energy and balancing markets. Hence, embodiments of the DHCA enable a predictable, reliable, smooth, and/or stable response from the entire collection of assets.

Embodiments of the disclosed technology allow the electrical infrastructure to tap all the values that can be provided by distributed assets for reducing wholesale costs, to manage congestion and capacity at various levels, and/or to manage the intermittency due to renewables. This will make distributed assets more valuable to the grid and more valuable to the customers who provide it. Embodiments of the disclosed technology can be extended to include the provision of ancillary and balancing services with these assets by dynamically selecting them and arming their autonomous response. This enables them to offer significant reliability benefits under disrupted operations.

III. Detailed Description of Example Embodiments of the Disclosed Hierarchical Control Architecture A. Overview of Distributed Hierarchical Control Architectures Embodiments of the disclosed technology employ a distributed control and decision making approach based on a transactive control paradigm as the central tenet. For example, certain embodiments use contract networks and agent-based systems to coordinate agent interactions within and across different hierarchical layers. In particular implementations, the following two elements of the infrastructure help facilitate smooth and reliable operations. The first is the inter-level infrastructure that allows agents at various levels to cooperate to determine the efficient allocation of the available resources. The second is the inter-temporal infrastructure that allows agents to shape the allocation they have received within the time horizon in which it is allocated. The agents in these embodiments can be implemented by transactive controllers comprising computing hardware as described above. The transactive controllers can be used to coordinate the distribution of electricity (e.g., the supply and/or use of electricity) at a variety of hierarchical levels in the power system.

The inter-level infrastructure addresses resource allocation and is used to reconcile supply resource limits with demand requirements (e.g., feeder constraints versus consumer comfort settings at the retail level). This can be accomplished by using real-time prices. In particular embodiments, for example, this infrastructure establishes a retail market that discovers the price at which supply equals demand at each feeder in the system given the current day-ahead price and prevailing conditions on the feeder and in the homes equipped with price-responsive devices.

Figure 2:
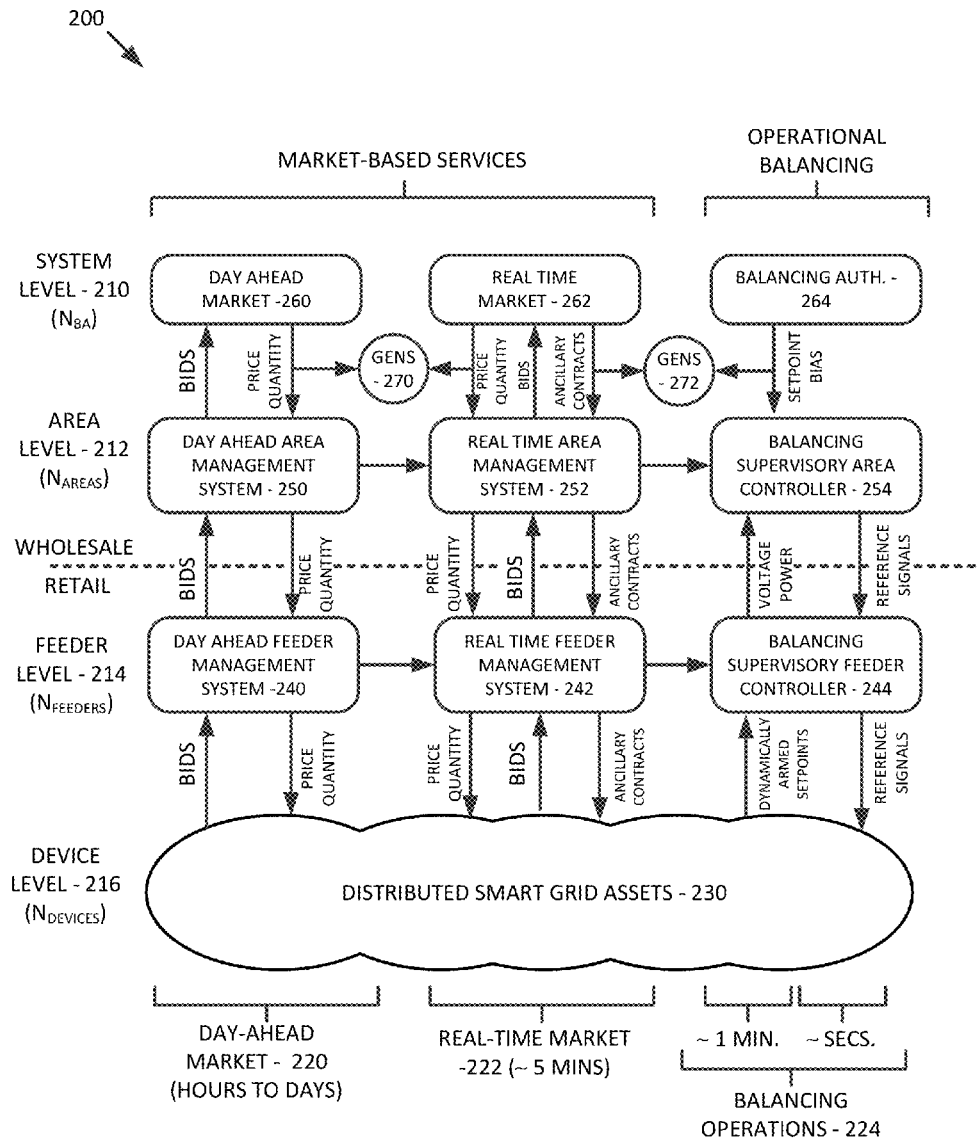
FIG. 2 is a block diagram of a system for coordinating distribution of electricity according to a distributed hierarchical control architecture (DHCA)

FIG. 2 is a block diagram 200 of an exemplary distributed hierarchical control architecture (DHCA) having a multi-level infrastructure. In FIG. 2, for example, the inter-level infrastructure comprises a device level 210, feeder level 212, area level 214, and system (ISO/RTO) level 216. The interaction of device level agents (collectively shown in FIG. 2 as distributed smart grid assets 230) with the feeder level controllers is facilitated through the newly formulated retail markets. In FIG. 2, the feeder level controllers are illustrated as comprising day ahead feeder management system 220 and real-time feeder management system 222. The area level controllers and the ISO/RTO interact in the wholesale market. In FIG. 2, the area level controllers are illustrated as comprising day ahead area management system 250 and real time area management system 252.

Block diagram 200 of FIG. 2 also shows that the exemplary DHCA comprises multiple temporal markets. In certain embodiments, for example, the inter-temporal infrastructure comprises a day-ahead market 220 (e.g., 24-hr), a real-time market 222 (e.g., ~5-15 min), and near instantaneous (e.g., ~sec) balancing operations 224.

In embodiments of the illustrated architecture, the real-time and day-ahead market-based feeder and area management systems 240, 242 aim to maximize (or otherwise increase) distributed asset participation in the real-time and day-ahead markets by incorporating the smart grid assets 230 into standard ISO/RTO market structures. This can be done by solving an optimization problem subject to feeder and area level operational constraints and uncertainties of intermittent renewables and distributed smart grid assets. At the wholesale system level, the ISOs and BAs (which operate respective system level controllers 260, 262 for the day-ahead and real-time markets) receive aggregated net load demand, supply bids for distributed assets from the area management systems 250, 252, and generator power supply offers from generator aggregators 270, 272.

In the illustrated embodiment, the ISO/RTO also runs balancing reserve markets (shown as balancing operations 224) in parallel with the energy markets to procure reserve capacity to maintain system stability. The cleared, or scheduled, power setpoints and reserve capacity requirements can then dispatched to area controllers, which in turn dispatch requirements or price signals to the feeder controllers and distributed assets in their respective retail markets.

More specifically, at the area level, to maintain operational balance at any given instant, an area-level controller (illustrated in FIG. 2 as comprising balancing supervisory area controller 254) solves an area wide optimization problem and then allocates a portion of its reserve capacity requirements to the feeder controller (illustrated in FIG. 2 as comprising balancing supervisory feeder controller 244). It also works to maintain adequate area-wide support in terms of frequency and tie-line flows.

At the feeder level, the feeder-level controller (e.g., the balancing supervisory feeder controller 244 in FIG. 2) then dispatches setpoints to the distributed assets and primary devices to meet the requirements of the area and feeder controllers. The setpoints can be dispatched at a relatively high frequency on the order of, for example, seconds to 1 minute.

At the device level, decentralized control schemes are used for the distributed assets 230 to provide both economic and reliability responses. These can be based on self-sensing of frequency, voltage, broadcasts of the imbalance signal, current and future prices, and/or device conditions. The distributed assets can be dynamically influenced via centralized control signals (such as setpoints dispatched from a feeder controller or an RTO/ISO controller) while responding autonomously and instantaneously (e.g., on the order of seconds, such as less than 60 seconds) during disrupted operations.

The following section introduced exemplary control strategies and market mechanism designs for operating components of the DHCA illustrated in FIG. 2.

B. Control Strategies and Market Mechanism Designs for DHCAs

Control strategies, market mechanisms, and incentive structures can be implemented for a full range of distributed assets in which they express their ability, willingness, and/or intent to modify their consumption or generation. These strategies, mechanisms, and structures set prices or incentives that coordinate the device's response to meet the needs of the grid, as a function of time and location, from the lowest-cost resources available. More specifically, a range of incentives and price schemes can be used to align with operational and capital costs, applicable in both vertically-integrated and restructured market environments, to ensure appropriate levels of customer incentives and the utility revenues needed to invest in and operate the network. The responsiveness of the smart grid assets to both balancing and market-based services is described next.

1. Market-Based Services

Current market structures do not support a level playing field for distributed assets when compared to conventional generation. Embodiments of the disclosed technology provide an equitable market mechanism for coordinating and controlling system assets through a distributed, self-organizing control paradigm which maintains customer free will, but incentivizes and coordinates participation. This is performed in some embodiments using a transactive control paradigm. Distributed smart grid asset participation in the wholesale market can be coordinated through a hierarchical architecture of nested market mechanisms, which involves designing retail markets, while leaving actual functional control at the device level. This allows load serving entities (LSEs) to play their natural role as a resource aggregator in the retail markets and allows for connections to independent third party aggregators for development of optimal portfolios.

The implementation of embodiments of the disclosed technology typically does not necessitate complete structural changes to current ISO/RTO day-ahead and real-time structures (system level). Instead, embodiments of the disclosed technology complement such structures by providing a mechanism to integrate retail and wholesale markets using a continuous feedback mechanism. In some embodiments, for example, at each of the hierarchical levels (e.g., feeder level 214 and area level 212), available resources—whether demand, supply, or ancillary services—are aggregated from the level below while considering local constraints, such as capacity limits. In particular, device level bids are aggregated by a feeder level controller (e.g., a feeder level management system) while applying local constraints (which enables clearing of a retail market). Further, the feeder level bids are aggregated by an area controller (e.g., an area level management system), which submits an aggregated bid curve into the ISO/RTO wholesale market. Conversely, the area and feeder controllers receive the cleared price and dispatch quantities from the ISO/RTO, which are eventually passed down to the end-use customers. This structure forms a feedback mechanism for a closed-loop, multi-level optimization problem, which allows distributed assets to be engaged in the wholesale market.

The same structural formulation can be applied in both day-ahead and real-time markets. In certain implementations, the only change between day-ahead and real-time markets is the formulation of agents' optimization problems. Exemplary methods for coupling control strategies with economic objectives to derive device level demand/supply bids will be described in the next section.

2. Device Level Controls and Demand/Supply Bids

Figure 3:
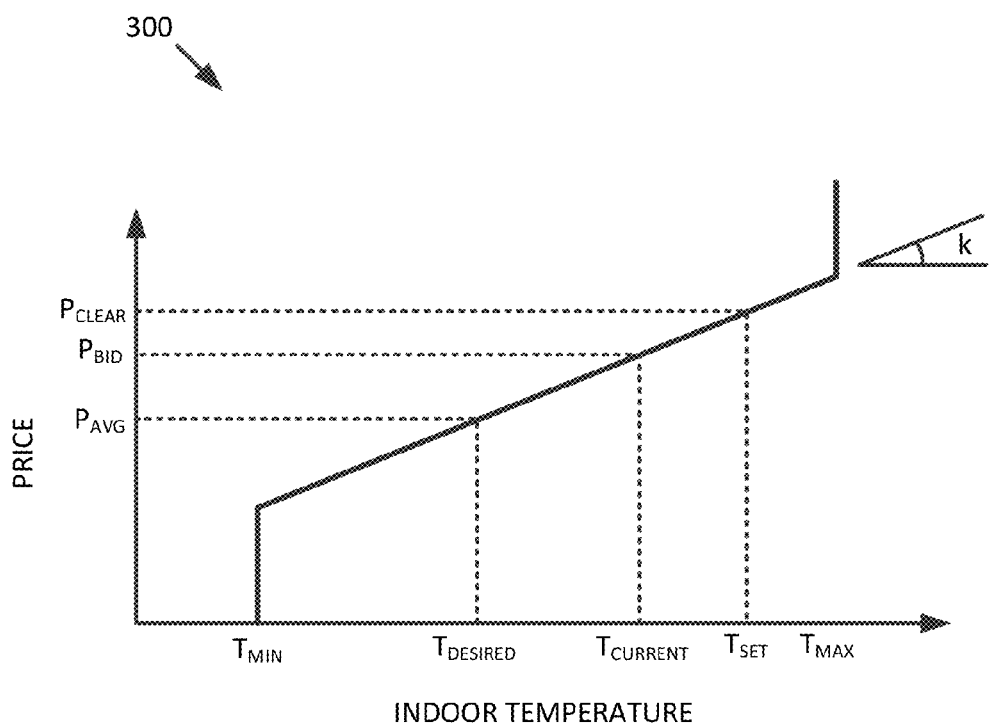
FIG. 3 is a block diagram of a graph that represents an HVAC bidding/response strategy that translates real-time price into a thermostat setpoint, and current air temperature into a demand bid.

In certain embodiments of the disclosed technology, at the primary level, the electrical devices 230 use price (and other information) to autonomously determine appropriate actions and apply their own constraints in a transactive manner. FIG. 3, for example, is a block diagram 300 of a graph that represents an HVAC bidding/response strategy that translates real-time price into a thermostat setpoint, and current air temperature into a demand bid. In certain implementations, customers are actively engaged with a simple user interface that allows users to choose along a range between "more comfort" and "more economic" with a simple slider bar. The consumer can also able to choose the level of market interaction and can override the response, as long as they are willing to pay higher prices. This helps to ensure customer free-will, while incentivizing participation. Exemplary implementations of such strategies are described in more detail in U.S. Nonprovisional application Ser. No. 12/587,008 filed on Sep. 29, 2009, and entitled "ELECTRIC POWER GRID CONTROL USING A MARKET-BASED RESOURCE ALLOCATION SYSTEM," (published as U.S.

Patent Application Publication No. 2010/0114387), which is hereby incorporated herein by reference.

Similar device bid and response mechanisms can be created for other distributed assets, including distributed storage, distributed generation, and smart appliances. Transactive strategies can be generated for a variety of devices. In certain implementations, for example, an environment and a set of rules for participation is created and used where vendors can create additional bidding and control strategies, depending upon the goals of the customer, ranging from relatively simple to highly complex optimization routines or predictive algorithms. Design of device level controls and bidding strategies forms the basis for their participation in retail markets. Equitable treatment of distributed assets in the wholesale markets can be accomplished through retail-wholesale integration as described in the following section.

3. Retail-Wholesale Integration

Embodiments of the disclosed technology provide a framework for fully integrated retail and wholesale power markets. The framework can provide a way for end-users (comprising distributed electrical devices, such as distributed smart grid assets) to participate in the wholesale markets. Embodiments of the retail market design are described first.

The retail market design facilitates interactions between end-users (distributed electrical devices or assets 230) and a feeder level controller (e.g., comprising the illustrated feeder level management systems 240, 242). The feeder level controller is designed to coordinate the behaviors of the distributed assets, within their respective retail markets. This provides an avenue to inject local constraints, which are often overlooked when solving system-wide problems. Feeder level optimization and control for a real-time retail market have been used in certain demonstration systems, whose technical aspects can be used to implement embodiments of the disclosed technology. For example, any of the control schemes described in U.S. Nonprovisional application Ser. No. 12/587,008 filed on Sep. 29, 2009, and entitled "ELECTRIC POWER GRID CONTROL USING A MARKET-BASED RESOURCE ALLOCATION SYSTEM," (published as U.S. Patent Application Publication No. 2010/0114387); U.S. Nonprovisional application Ser. No. 12/686,243 filed on Jan. 12, 2010, and entitled "NESTED, HIERARCHICAL RESOURCE ALLOCATION SCHEMA FOR MANAGEMENT AND CONTROL OF AN ELECTRIC POWER GRID" (published as U.S. Patent Application Publication No. 2010/0179862); or U.S. Nonprovisional application Ser. No. 14/108,078 filed on Dec. 16, 2013, and entitled "TRANSACTIVE CONTROL AND COORDINATION FRAMEWORK AND ASSOCIATED TOOLKIT FUNCTIONS", all of which are hereby incorporated herein by reference in their entirety, can be used in embodiments of the disclosed DHCA. Sometimes, in those systems, system-wide constraints (in the form of, for example, wholesale market prices and/or locational marginal prices (LMPs)) are coupled with local constraints (local feeder capacity) to clear retail markets and provide both local and system-wide benefits. Effectively, the systems enable customers to reduce their energy consumption during high price events to reduce energy costs, while coordinating HVAC response during localized congestion events to decrease demand, providing a system to equitably reward customers for participation.

Distributed generation and storage may similarly bid into the retail market, subject to runtime constraints (e.g., the number of allowable run hours). While successfully showing that distributed assets can participate in retail level markets, the distributed assets in the demonstration projects did not affect the wholesale price; they only reacted to wholesale prices and local constraints.

In embodiments of the disclosed technology, the feedback loop is closed by integration of retail and wholesale energy markets. This integration allows distributed assets to interact with and affect the wholesale market through the feeder (retail market) and area level controllers (e.g., the feeder and area level management systems 240, 242, 250, 252 illustrated in FIG. 2). In particular implementations, price and availability information flow from the device level to the feeder level (e.g., to feeder level controllers, such as systems 204, 242, which act as retail aggregators). For example, in certain embodiments, the feeder level controller combines individual demand bids, including battery demand bids for charging. Similarly, the feeder level controller combines the supply bids from distributed generators and battery discharging to form feeder level supply curves. The aggregate demand and supply bids are reported to an area level controller (e.g., area level management systems 250, 252 as in FIG. 2), which combines various feeder level bids to report to the ISO/RTO (wholesale market). Once the wholesale market clears, the cleared prices and quantities are reported back to the area and feeder level controllers, which apply their local constraints to clear the respective "markets."

Figure 4:
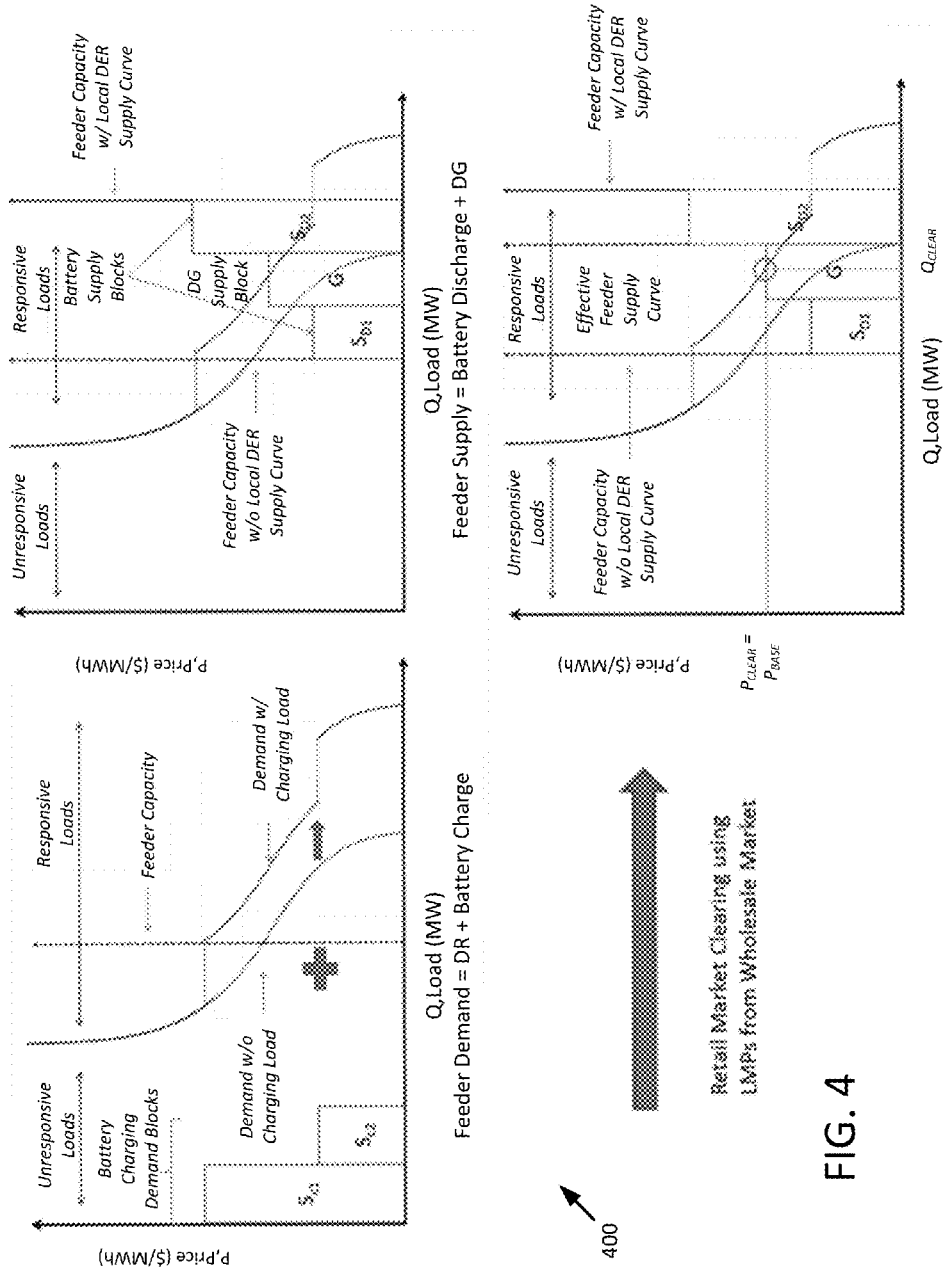
FIG. 4 is a block diagram of an example retail market clearing process.

One such retail market clearing process is demonstrated in block diagram 400 of FIG. 4. In the example illustrated in FIG. 4, based on wholesale market clearing (LMP determination), only battery block SD1 and DG are cleared to supply energy while both supply block SD2 and demand block SC2 are not cleared. The bids submitted by distributed assets are used in the clearing of the wholesale market, and by extension, the retail markets as well. Hence, the optimal bids of distributed assets, as a function of their desired control strategies, can be determined using the feedback mechanism created through integration of retail and wholesale markets.

In certain implementations, the end-users' bidding process are modeled using learning capabilities. The end users can simultaneously (or substantially simultaneously) report supply bids to participate in ancillary services markets. The demand curves for ancillary services can be derived by respective entities at the different levels and markets can be cleared similar to the energy market.

In certain embodiments, the wholesale markets are operated by an ISO/RTO and facilitate interactions between the ISO/RTO and the area level controllers (e.g., the area level management systems 250, 252). Conventional and grid-level renewable generation can also operate directly in the wholesale markets. The ISO/RTO can clear the wholesale market using the processes of security constrained unit-commitment and economic dispatch. Given the high percentage of renewables and distributed assets to be modeled in certain environments, it may be desirable to use stochastic versions of market clearing processes.

In some embodiments, at the area level controllers (which act as wholesale aggregators), feeder level bids are aggregated and area constraints are applied to derive wholesale market bids. This has the advantage that, at the area level, distributed asset constraints are no longer considered but rather handled at the lower level of control. In return, the ISO can establish wholesale market prices, which are delivered to the area level management system. The optimal bidding strategies problem of the area level management system can be modeled as a mathematical program with equilibrium constraints. The outer problem of the bi-level problem is the area level management system's optimization problem while the inner problem is the ISO's optimization problem. Hence, the wholesale market clearing process will depend on bids provided by agents and entities at different levels. The bids, in turn, can be formulated based on market clearing processes at both wholesale and retail layers. The integration of retail and wholesale markets in this manner facilitates greater participation by distributed assets. The design of the retail and wholesale markets can be kept the same in both day-ahead and real-time markets. The interaction of agents in day-ahead and real-time markets is described next.

4. Interaction of Day-Ahead and Real-Time Markets

Day-ahead markets are operated as pure financial markets, allowing participants to enter financially binding contracts that hedge against price volatility in real-time markets. The real-time markets serve as imbalance markets.

The principle of the two-settlement system can be preserved in embodiments of the disclosed technology. For example, in certain embodiments, distributed assets are able to enter into contracts to procure or sell most of their power "needs" in the day-ahead markets. The residual amount of power is transacted in the real-time markets, when more information of the prevailing weather and system conditions become available. The real-time markets can also serve to correct the imbalance between contracted day-ahead positions and actual real-time positions. The horizontal information flow between retail and wholesale market, and their respective entities (feeder-level and area-level management systems) can be modeled similar to distributed assets.

In the presence of high renewable and distributed assets penetration, economics cannot be the only objective for using distributed resources in an effective manner (unless reliability can be translated into costs). As illustrated in FIG. 2, markets and control strategies for balancing services can be run in parallel with retail and wholesale markets in both day-ahead and real-time markets. The market clearing mechanism used in the wholesale markets can clear balancing reserves by co-optimizing energy and balancing needs. For example, embodiments of the framework illustrated in FIG. 2 can allow clearing balancing markets at a nodal level, rather than system or zonal levels as is the norm today. Hence, the prices for balancing reserves more realistically reflect the demand for reserve capacity; for instance, areas with greater wind penetration would require more reserve capacity, reflected in the nodal prices. The framework also allows for balancing markets to be cleared at the retail level with greater penetration of distributed assets.

Further, the balancing reserves can be determined endogenously, based on energy demand and supply, rather than set as hard limits as is the norm in most markets today. The balancing service needs will be described in more detail in the next section.

5. Balancing Services

In certain embodiments of the disclosed technology, a reliability safety net is created, comprising fast-acting smart grid assets (e.g., distributed smart grid assets 230). These distributed assets can be aggregated into a grid-friendly network of actively-configured, autonomous responses to self-sense frequency and voltage fluctuations, and broadcast signals for control area imbalance. This enables the assets to provide the full range of today's ancillary services and more: virtual inertia, regulation, ramping, spinning reserve, and/or emergency curtailment capabilities. Example control strategies at each level are discussed in more detail in the subsections below.

a. Balancing Supervisory Area Controller

The balancing supervisor (e.g., balancing supervisory area controller 254) enables DSGAs to provide balancing services, reducing the burden on conventional generation, particularly when increasing balancing requirements are expected due to the high integration of renewable variable generation. The balancing supervisory area controller can be implemented as part of an area controller that also computes the transactive signals for participating in the real-time or day-ahead market or can be implemented separately. Thus, the area controller may comprise a system of multiple computing devices (each implementing one or more of the day-ahead area management system 250, real time area management system 252, or balancing supervisory area controller 254) or comprise a single computing device that performs all of those functions. For ease of discussion, however, all such implementations are encompassed by the term "area controller".

At the area level, and according to one exemplary embodiment of the disclosed technology, the goal of the balancing supervisor is to minimize (or otherwise reduce) a DSGA Area Control Error (DSGA-ACE) signal, which is a weighted sum of the deviations of the system frequency and the inter-area power flow. The balancing supervisor can be coordinated with Automatic Generator Control (AGC) at the transmission level to provide frequency and tie line interchange support (minimizing or otherwise reducing balancing authority ACE). In particular implementations, the balancing supervisor, in coordination with AGC, aims to maintain the system frequency at 60 Hz during the normal load demand fluctuation and to restore the system frequency gradually when a contingency occurs in the system. In particular, the balancing supervisor desirably maintains the inter-area power flow at the desired level. The inter-area power flow reference value is calculated based on differences of measured total area real and reactive power and reference values the power reference set by a Balancing Authority (BA) and the cleared power reference from a Real Time Area Management System (e.g., a real-time controller configured to participate in the real-time market). The balancing supervisor can weight these two power references according to the current system operating conditions.

Figure 6:
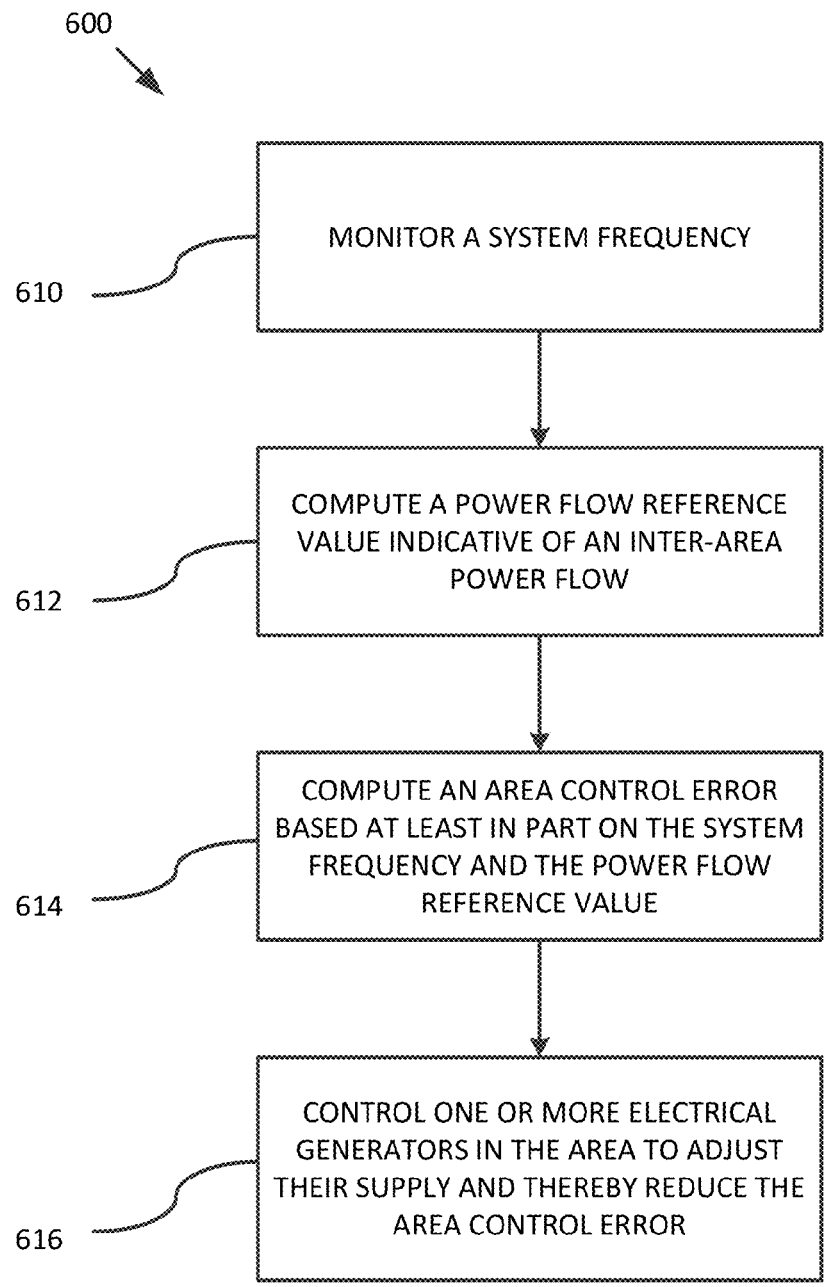
FIG. 6 is a flowchart showing an exemplary embodiment for operating an area controller configured to coordinate the distribution of electricity to and from multiple feeder networks of an area.

FIG. 6 is a flowchart 600 illustrating one exemplary method for performing balancing operations at an area controller (e.g., using the balancing supervisory area controller 254). The method of FIG. 6 can be performed using computing hardware (e.g., a computer processor or an integrated circuit). For instance, the method can be performed by a computer or specialized hardware of a utility or power system operator and be configured to exchange signals with feeders in the area and with one or more ISO/RTO computing entities. Furthermore, it should be understood that the method acts in FIG. 6 do not necessarily occur in the illustrated sequence.

At 610, a system frequency is monitored. For example, the system frequency can be monitored at one or more points in the area (e.g., across multiple feeders in the area).

At 612, a power flow reference value indicative of an inter-area power flow is computed. In certain embodiments, and as discussed above, the power flow reference value is based on one or more of: (a) differences between measured area real and reactive power and power reference values set by a system-wide Balancing Authority (BA); or (b) differences between measured area real and reactive power and power reference values for a current cleared time interval of a transactive control energy market in which the area controller operates. For example, the power flow reference value can be based on a weighted sum of (a) and (b), and (a) can be weighted more heavily during contingencies and (b) can be weighted more heavily during normal operation.

At 614, an area control error is computed based at least in part on the system frequency and the power flow reference value. For example, the area control error can be computed as described above.

At 616, one or more electrical generators in the area are controlled to adjust their supply and to thereby reduce the area control error.

In certain embodiments, the power flow reference value is transmitted to controllers for the multiple feeder networks (e.g., to a feeder level controller implementing a balancing supervisory feeder controller 244). As explained above, the power flow reference value can then be used by the feeder networks to compute feeder-level reference values that are used autonomously by the feeders to control electrical devices (e.g., distributed smart grid assets) to help address any imbalance.

In some embodiments, the method is performed in cooperation with a transactive control energy market in which the area controller also participates. Thus, as the method of FIG. 6 is being performed, the area controller can additionally operate as a transactive node in the energy market (e.g., the area controller can implement one or more of the day-ahead area management system 250 or real-time area management system 252). This participation can involve computing one or more transactive signals representing a bid for using or supplying electricity in an upcoming time interval of a transactive control energy market, the time interval being a periodic time interval (e.g., a time interval associated with a real-time market, a day-ahead market, or both).

b. Balancing Supervisory Feeder Controller

The feeder controller (e.g., comprising balancing supervisory feeder controller 244) connects the area controller with individual devices. The balancing supervisory feeder controller can be implemented as part of a feeder controller that also computes the transactive signals for participating in the real-time or day-ahead market or can be implemented separately. Thus, a feeder-level controller may comprise a system of multiple computing devices (each implementing one or more of the day-ahead feeder management system 240, real time feeder management system 242, or balancing supervisory feeder controller 244) or comprise a single computing device that performs all of those functions. For ease of discussion, however, all such implementations are encompassed by the term "feeder controller".

In particular embodiments, the feeder controller's role is bidirectional in the sense that: (i) it "translates" the balancing need specified by the area control to individual control actions for the devices; and (ii) it estimates elasticity of the assets and sends this information to the area controller.

In certain embodiments, the feeder controller has two objectives. The first one is to minimize (or otherwise reduce) a Feeder Control Error (FCE) signal which represents the weighted sum of the differences between the measured total feeder real and reactive power and the reference values. The second objective is to coordinate various devices to provide VAR support for voltage regulation.

In certain embodiments, the feeder real power reference is calculated based on the power reference received from an area controller (e.g., from a balancing supervisory area controller 254) and the power reference for an imminent time interval for the real-time market (e.g., from a market-based real time feeder management system 242). As noted, the balancing supervisory feeder controller 244 may be implemented as part of the feeder controller that also implements the real time feeder management system 242, either through separate computing hardware or as integrated hardware. The feeder controller can weight these two power references according to the current system operating conditions. During normal conditions, the cleared power reference from the market-based entity will be given more weight, while during contingencies, the signal received from the balancing entity will be weighted more. Additionally, the feeder controller can account for variability and uncertainty of local distributed renewable generation (such as rooftop photovoltaic panels), and local constraints such as feeder congestion. After the feeder real power reference is determined, the feeder controller dispatches setpoints (e.g., optimal setpoints) to the devices to maintain adequate power support.

Additionally, in some embodiments, the feeder controller collects real time feeder voltage information from devices involved in VAR support. Then the feeder controller can coordinate with local device-level controllers by dispatching voltage setpoints and, if necessary, can also over-ride the local decentralized control signal to avoid excessive voltage regulation.

Figure 7:
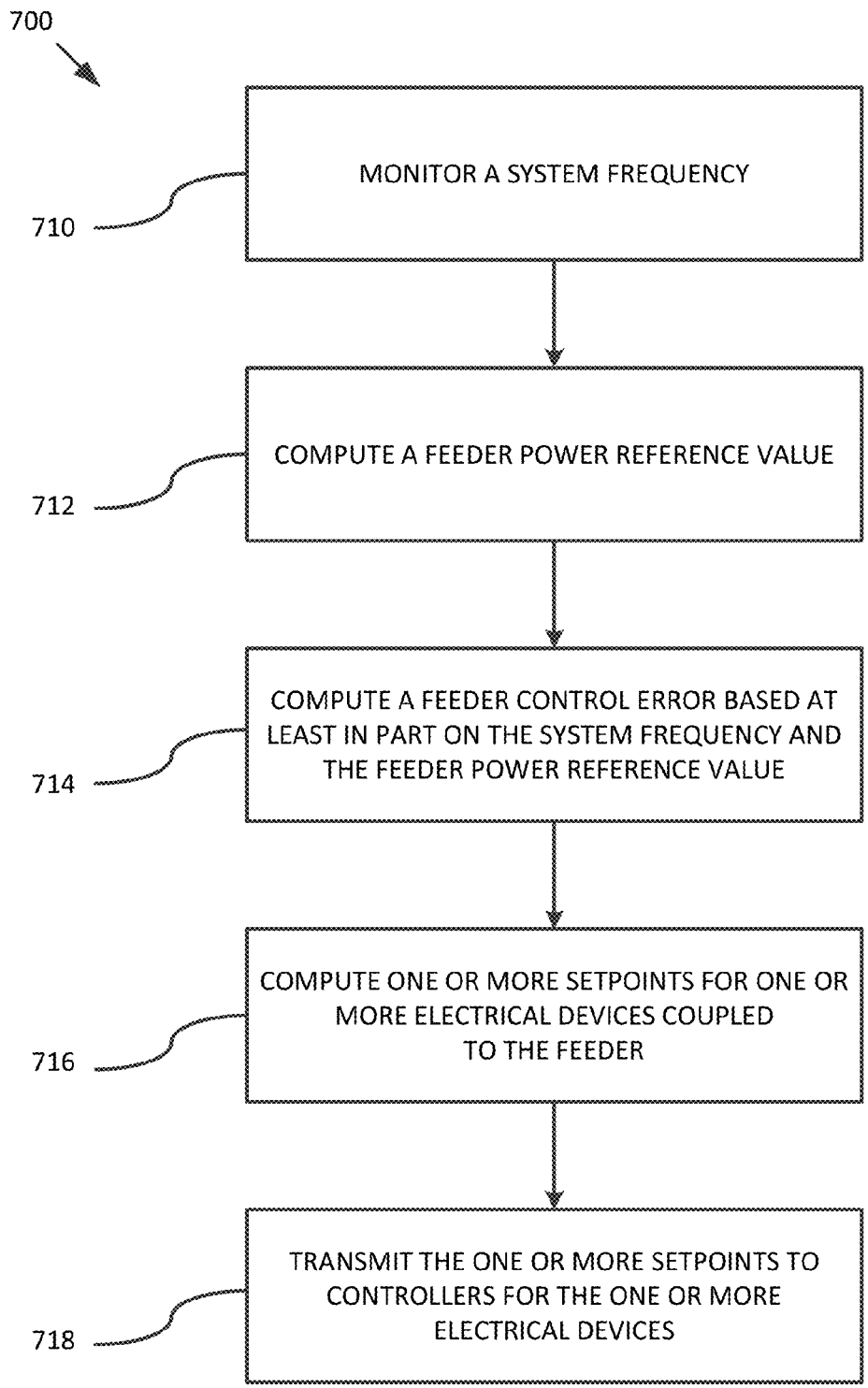
FIG. 7 is a flowchart showing an exemplary embodiment for operating a feeder controller configured to coordinate the distribution of electricity to and from multiple electrical devices (e.g., distributed smart grid assets) coupled to a feeder controlled by the feeder controller.

FIG. 7 is a flowchart 700 showing one exemplary method for performing balancing operations at a feeder controller (e.g., using the balancing supervisory feeder controller 244). The method of FIG. 7 can be performed using computing hardware (e.g., a computer processor or an integrated circuit). For instance, the method can be performed by a computer or specialized hardware of a utility or power system operator and be configured to exchange signals with electrical devices (e.g., assets 230) served by the feeder and with one or more area controllers (e.g., a balancing supervisory area controller 254). Furthermore, it should be understood that the method acts in FIG. 7 do not necessarily occur in the illustrated sequence.

At 710, a system frequency at the feeder is monitored.

At 712, a feeder power reference value is computed. In some embodiments, the feeder power reference value is based on one or more of: (a) differences between measured feeder real and reactive power and power reference values set by an area controller; or (b) differences between measured feeder real and reactive power and power reference values for the feeder for a current cleared time interval of a transactive control energy market in which the feeder operates. For example, the feeder power reference value can be based on a weighted sum of (a) and (b), and (a) can be weighted more heavily during contingencies and (b) can be weighted more heavily during normal operation.

At 714, a feeder control error is computed based at least in part on the system frequency and the feeder power reference value.

At 716, one or more setpoints are computed for one or more electrical devices coupled to and served by the feeder. In certain embodiments, the setpoints are configured to adjust performance of the one or more electrical devices so that the feeder control error is reduced.

At 718, the one or more setpoints are transmitted to controllers for the one or more electrical devices (e.g., to transactive controllers for the devices).

In some embodiments, the method is performed in cooperation with a transactive control energy market in which the feeder controller also participates. Thus, as the method of FIG. 7 is being performed, the feeder controller can additionally operate as a transactive node in the energy market. This participation can involve computing one or more transactive signals representing a bid for using or supplying electricity in an upcoming time interval of a trans active control energy market, the time interval being a periodic time interval (e.g., a time interval associated with a real-time market, a day-ahead market, or both).

c. Device Level Control

At the device level, distributed assets (e.g., distributed smart grid assets 230) desirably provide multiple services at different time scales, including, for instance, one or more of the following services: (1) responding to market prices, (2) responding to an imbalance signal (e.g., from the feeder controller), and/or (3) responding autonomously to reliability needs.

Autonomous responses are desirable for many reliability purposes where there may not be time to communicate needed actions through a wide-area network. Appliance and equipment manufacturers are rapidly moving toward mass production of devices with smart grid capabilities that can be leveraged for this purpose. However, utilities and balancing authorities have been hesitant to support such deployments because the response of fleets of such devices has not been fully integrated with their control schemes for grid stability.

Distributed assets in embodiments of the disclosed technology are equipped with autonomous controllers with settings armed according to instructions from feeder, area or system levels. In this way, the autonomous immediate response of devices can be tailored to system needs, such as low system inertia due to high on-line renewable generation.

To provide the multiple services, at the device level, distributed assets can be equipped with multi-objective control strategies developed to enable single resources to provide multiple benefits to the system. These control strategies can be accounted for in the coordination problem, for example, by using a receding horizon optimization technique (e.g., model predictive control).

d. Integrating Balancing and Market-Based Services

In certain embodiments, the real-time market management systems (both area and feeder level) play an additional role. As part of the co-optimization problem developed at each level, ancillary service contracts can also be formed on the same time scale as the real-time energy market, and weighted against real-time energy market requirements. During normal operations, the management systems typically take a purely economic perspective to maximize (or otherwise increase) reward (profit) by dispatching smart grid assets either towards real-time energy needs, ancillary service needs (such as frequency or voltage regulation, spinning reserve, etc.), or a combination of both.

In certain embodiments, during disrupted or stressed system conditions, weighting functions are adjusted to focus on system stability requirements rather than economic concerns. Effectively, during each real-time market cycle (e.g., at a ~5 min, or other real-time market cycle), the management systems at each level (implemented by transactive controllers at each level) form a "contract" for real-time energy and balancing/regulation services, dispatching resources subject to local constraints and availability provided by device bidding. This allows the smart grid assets to participate in multiple market revenue streams under a multi-objective control problem (e.g., a storage device participating in both energy markets and frequency regulation), capturing multiple revenue streams to increase profitability and long-term sustainability. Also of note, is that at this time-scale, "contracts" are formed for ancillary services, while the control is performed on a much faster scale (as described in the section on operational and balancing services).

e. Control Strategies During Disrupted Operations

In embodiments of the disclosed technology, the distributed smart grid assets 230 (e.g., the end-use electrical devices) are dynamically armed for instantaneous autonomous response during normal and disrupted operations. Disrupted operations may occur, for example, due to a loss of communications or an emergency event. This allows each asset (electrical device) to respond to the correct extent to avoid amplifying frequency oscillation. For non-controllable loads that cannot continuously adjust their power use (such as water heaters, HVACs, and the like), the devices can be switched on/off probabilistically so that the aggregation of a large number of these loads will provide the desired amount of power droop. Distributed control strategies can be designed to coordinate the different devices to respond autonomously while maintaining the overall stability of the system. One exemplary approach is to use the mean-field game (MFG) theoretic framework. The basic premise behind the MFG framework is that it provides insights on the behavior of large population of "agents", where each agent optimizes his action taking into account his own objectives as well as global macroscopic information (e.g., aggregate impact of the actions of all other players). The resulting problem has a dynamic game structure, since each player optimizes independently based on his available information. Under limiting conditions, such as population size approaching infinity, the common information available to the players reduces to a deterministic quantity and the game can be analyzed using dynamic programming techniques. In the context of distributed assets, each resource—be it a distributed generator or load (demand response) or storage device—observes the frequency signal that is common to the entire system and which depends on the power injections/withdrawals of all the resources in the system. The resource then adjusts its injection/withdrawal to correct the deviation of the frequency from its nominal value.

f. Other Cases: Feeder Level System Owns and Manages Distributed Assets

The previous discussion has assumed that the distributed assets are owned by the end-users. In the case where the feeder level entity owns and operates the distributed assets, optimization goals may be re-ordered. Embodiments of the disclosed technology can also account for cases where the feeder level entity owns the distributed assets. To be consistent with the completely decentralized (transactive) control and decision making paradigm, the total capacity of distributed assets in the system can be kept the same between the two cases. The feeder level management system can use local constraints and distributed asset control strategies to form the feeder level demand and supply curves to facilitate retail market clearing. The same formulation can be used in both day-ahead and real-time markets.

As seen in block diagram 400 of FIG. 4, the market-clearing mechanism determines which assets get cleared to participate in the market and the corresponding reward they earn. The distributed asset control strategy used by a feeder level management system can directly influence retail and wholesale market clearing and, hence, the rewards of distributed assets. It is therefore desirable that the entity appropriately weight risks and rewards in selecting an appropriate (e.g., optimal) control strategy. A control strategy that weighs risk more than reward would adversely impact revenues by clearing fewer resources, while an objective weighted higher with customer rewards would expose the aggregator to undue risks. The risk for a feeder level management system manifests itself in the form of under-supply of energy or reserves relative to the contracted amounts. Additionally, the entity would be burdened with procuring additional capacity at presumably higher costs. The reward, on the other hand, is derived from supply of energy and reserve capacity to the system. This model can also be extended in a manner where the aggregator contracts with the end users to manage their DSGs in return for energy cost savings and/or revenues from the supply of energy and reserves. The aggregator desirably selects a control strategy to properly align end user economic incentives with its own, while minimizing (or otherwise reducing) risk exposure.

C. General Embodiments of the Disclosed Technology

It should be understood that the architecture shown in block diagram 200 of FIG. 2 is a specific example of a DHCA and that variations exist without departing from the principles underlying the example architecture. This section describes general embodiments of the disclosed technology exemplified by FIG. 2 and the discussions above. For instance, in certain embodiments, the system can be generally described as a system comprising two energy markets—wholesale and retail—that includes a means for integrating the two markets, such as through transactive signals that are exchanged between the two markets.

More generally, then, embodiments of the disclosed technology include a system comprising one or more transactive controllers configured to operate a wholesale market for coordinating the distribution of electricity between bulk power generation resources and area controllers that distribute electricity to and from multiple feeder networks, and one or more transactive controllers configured to operate a retail market for coordinating the distribution of electricity between one or more of the feeder networks and one or more electrical devices. Further, at least one of the transactive controllers in the wholesale market is configured to exchange transactive control signals with at least one of the transactive controllers in the retail market. The retail market is thereby integrated with the wholesale market. The integration of the retail market with the wholesale market allows one or more electrical devices to participate in the wholesale market via the exchanged transactive control signals between the at least one of the transactive controllers in the wholesale market and the at least one of the transactive controllers in the retail market.

Further, in certain implementations (and as illustrated in FIG. 2 and discussed above), at least one of the transactive controllers in the retail market is a transactive controller associated with a respective one of the feeder networks and is configured to: (a) exchange transactive control signals with transactive controllers for multiple electrical devices served by the respective one of the feeder networks; (b) aggregate bids for supply, demand, or both supply and demand from the electrical devices; and (c) generate bids for supply, demand, or both supply and demand for the wholesale market based at least in part on the aggregated bids.

In further implementations (and as illustrated in FIG. 2 and discussed above), at least one of the transactive controllers in the wholesale market is a transactive controller associated with one of the area controllers and is configured to: (a) exchange transactive control signals with transactive controllers for multiple feeder networks in a respective area; (b) aggregate bids for supply, demand, or both supply and demand from the transactive controllers for the multiple feeder networks; and (c) generate bids for supply, demand, or both supply and demand for the wholesale market based at least in part on the aggregated bids.

In certain implementations, one or more of the transactive controllers configured to operate in the wholesale market comprises a system-level transactive controller associated with an ISO or RTO. The ISO or RTO can clear the wholesale market using one or more of security constrained unit-commitment or economic dispatch. Further, a system-level transactive controller can be configured to transmit signals indicative of a cleared price and a quantity of electricity to a respective area-level transactive controller (an area controller).

In some implementations, the system-level transactive controller is further configured to compute and transmit a setpoint for use by one or more electrical devices in the event of a disruption to the electrical system.

In certain implementations, the one or more transactive controllers in the wholesale market and in the retail market are further configured to operate in multiple temporal markets. For example, the transactive controllers can operate in a real-time market and a day-ahead market. In particular implementations, the real-time market comprises a market for settling a price for electricity in an imminent time interval (e.g., an upcoming (or next-to-occur) time interval, which may be of any suitable duration, such as 5 minutes, 10, minutes, 15 minutes or other such duration). Further, the day-ahead market can comprise a market for settling power supply commitment for the following day.

In some implementations, at least one of the transactive controllers configured to operate in the retail market is further configured to receive a signal indicative of an imbalance or disruption in the system, and, in response thereto, adjust electrical supply or demand of one or more electrical devices associated with the at least one of the transactive controllers.

In a more specific embodiment, the example architecture of FIG. 2 illustrates a system for coordinating distribution of electricity according to a distributed hierarchical control architecture (DHCA), comprising one or more device-level transactive controllers at a device level of the DHCA; one or more feeder-level transactive controllers at a feeder level of the DHCA; one or more area-level transactive controllers at an area level of the DHCA; and one or more system-level transactive controllers of the DHCA.

In the illustrated embodiment, at least one of the device-level transactive controllers and at least one of the feeder-level transactive controllers is configured to communicate with one another, at least one of the feeder-level transactive controllers and at least one of the area-level transactive controllers is configured to communicate with one another, at least one of the area-level transactive controllers and at least one of the system-level transactive controllers is configured to communicate with one another.

Further, the transactive controllers can be configured to participate in a transactive control energy market as well as to perform balancing operations designed to improve the stability of the power system. For instance, the device-level transactive controllers, feeder-level transactive controllers, area-level transactive controllers, and system-level transactive controllers can be configured to participate in a real-time market for settling a price for electricity in one or more upcoming time intervals for the real-time market. Further, at least some of the device-level transactive controllers, feeder-level transactive controllers, area-level transactive controllers, and system-level transactive controllers can also be configured to participate in a balancing market, the balancing market being configured to maintain system stability during periods of imbalance in the system. It is to be understood that the phrase "transactive controller" as used in this context may comprise a system of computing devices, where one computing device is responsible for participating in the real-time market and another computing device is responsible for participating in balancing operations, or may comprise a single computing device configured to perform all the operations.

In particular implementations, the device-level transactive controllers operate at a faster frequency in the balancing market than in the real-time market. Further, in certain implementations, one or more of the device-level transactive controllers participating in the balancing market are configured to control a controllable load or a controllable energy supply. For example, in certain implementations, one or more of the device-level transactive controllers participating in the balancing market are configured to control discharging and charging of an electric battery. In some implementations, one or more of the device-level transactive controllers participating in the balancing market are configured to provide balancing services by reacting autonomously to one or more of a frequency of the power system, voltage of the power system, a broadcast imbalance signal, current real-time market price, day-ahead price, or device conditions. Further, in certain implementations, the device-level transactive controllers, feeder-level transactive controllers, area-level transactive controllers, and system-level transactive controllers are further configured to participate in a day-ahead market for settling a price for electricity for a following day.

Figure 5:
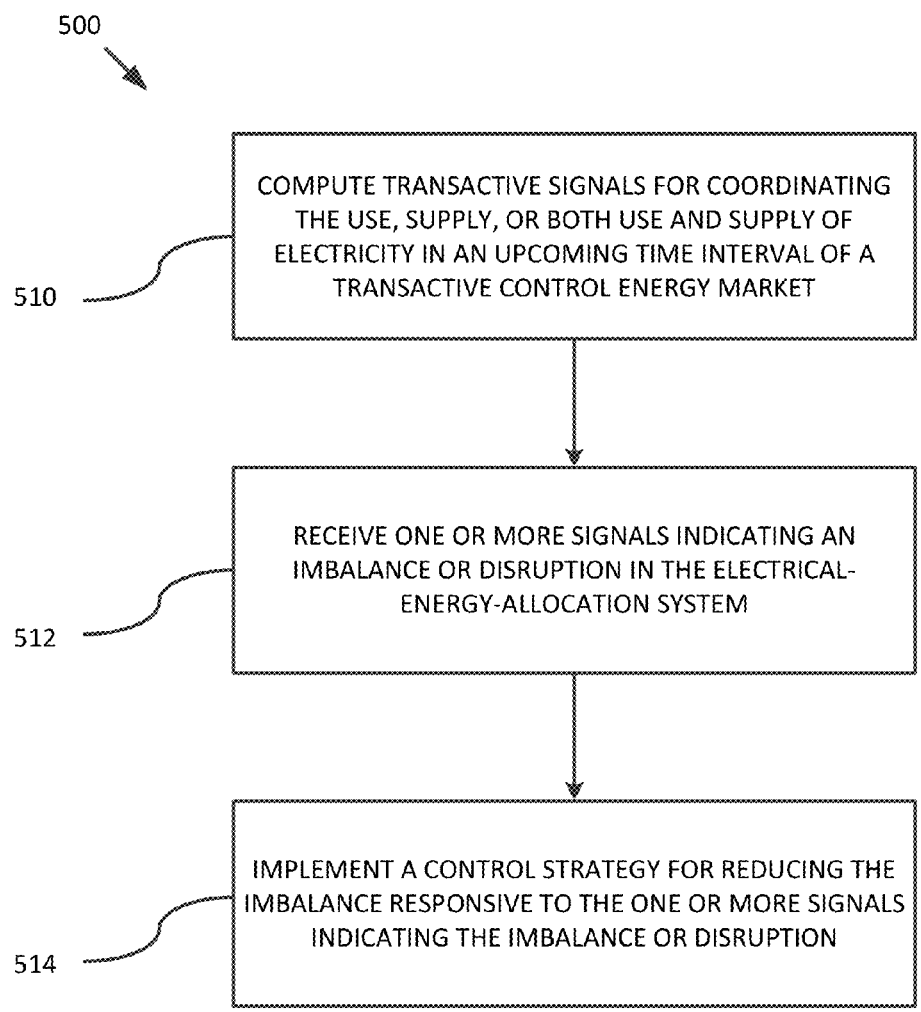
FIG. 5 is a flowchart showing an exemplary embodiment for operating a transactive controller in a market-based electrical-energy-allocation system.

FIG. 5 is a flowchart 500 showing another exemplary embodiment for operating a transactive controller in a market-based electrical-energy-allocation system. The method shown in FIG. 5 can be implemented, for example, by a device-level transactive controller used to control one or more electrical devices (e.g., distributed smart grid assets) in a system, but this usage should not be construed as limiting. The electrical device can be a variety of devices or assets, such as an air-conditioning unit; heating unit; heating, ventilation, and air conditioning (HVAC) system; hot water heater; refrigerator; dish washer; washing machine; dryer; oven; microwave oven; pump; home lighting system; electrical charger; electric vehicle charger; home electrical system; or any other electrical system having variable performance states. The method of FIG. 5 can be performed using computing hardware (e.g., a computer processor or an integrated circuit). For instance, the method can be performed by a computer at an end-user's locale or home, a computer coupled to an electrical device, or by specialized hardware (e.g., an ASIC or programmable logic device) coupled to the electrical device. Furthermore, it should be understood that the method acts in FIG. 5 do not necessarily occur in the illustrated sequence.

At 510, one or more transactive signals are computed for coordinating the use, supply, or both use and supply of electricity in an upcoming time interval of a transactive control energy market. The time interval can be a periodic time interval (e.g., every 5 minutes, 10 minutes, 15 minutes, or other such interval).

At 512, one or more signals are received indicating an imbalance in the electrical-energy-allocation system.

At 514, a control strategy for reducing the imbalance is implemented responsive to the one or more signals indicating the imbalance. For example, electrical use or supply of the one or more electrical devices controlled by the transactive controller can be adjusted. The adjusting can comprise a number of difference responses (e.g., depending on whether the electrical device(s) controlled by the transactive controller have widely variable performance states (controllable electrical devices) or simply two operational states, on and off (non-controllable electrical devices). Thus, the adjusting can comprise shutting off the electrical device, turning on an electrical device, reducing an electricity consumption rate of the electrical device, or increasing an electrical supply from the electrical device.

In certain implementations, the receiving and the implementing occur independent and autonomously of the transactive signals exchanged during the periodic time interval. For example, in certain implementations, the receiving and the implementing occur asynchronously to the fixed interval frequency. Thus, the transactive controller is able to quickly respond to imbalances in the system at a rate that is faster than the frequency at which prices and electricity distribution is settled in the real-time market. In some implementations, the control strategy that is implemented is based at least in part on a setpoint dispatched from a controller associated with a feeder with which the electrical device is connected. For instance, in the event of a disruption, the electrical devices controlled by the transactive controller can be set to respective setpoints dispatched from the feeder controller.

In some implementations, the one or more signals indicating the imbalance comprise one or more of a frequency of the power system, voltage of the power system, or a broadcast imbalance signal (e.g., broadcast from a feeder controller, an area controller, or an ISO/RTO controller).

In certain implementations, a disruption to the system is detected (e.g., as a result of a major contingency or communication outage) and a control strategy for responding to the disruption is automatically implemented until the disruption ends. For instance, the control strategy can comprise shutting off the electrical device, reducing an electricity consumption rate of the electrical device, or increasing an electrical supply from the electrical device. This helps create a predictable response among distributed smart grid assets for the ISO/RTO.

D. Simulation Platform for DHCA

Modeling of smart grid applications is desirably performed using an integrated modeling approach that portrays the performance of the assets. This is in context with the surrounding bulk generation, transmission infrastructure, market systems, reliability coordination, and other aspects of utility planning and operations. Power system modeling and simulation tools are available for a wide range of these applications, but do not effectively capture the rich interactions between the different domains. To address this problem, and to provide a platform for rapid control algorithm prototyping, embodiments of the disclosed technology comprise a simulation platform that simultaneously models the integrated transmission and distribution systems, incorporates wholesale and retail markets (real-time and day-ahead), and/or considers the communication requirements needed to realize the integrated system. In one particular implementation, the simulation platform comprises a transmission solver (e.g., PowerWorld), a distribution and smart grid asset simulator (e.g., GridLAB-D), a market-based simulator (e.g., SuperOPF) and/or a communications simulator (e.g., ns-3). The platform can also include "hardware-in-the-loop" functionality for validating the final DHCA by tying directly into existing devices where applicable.

In particular implementations, the four simulation tools provide a testbed for evaluating and designing embodiments of the disclosed DHCA. The tools can be used independently or in an integrated fashion to facilitate the development of the DHCA.

E. Validation and Testing of DHCA Embodiments

In certain implementations, validation of one or more components and/or control strategies can be part of the process of implementing the disclosed technology for a particular area. Where available, hardware-in-the-loop and existing market and visualization tools can be incorporated into the simulation environment to test the validity of the particular implementation being developed.

F. Technology Commercialization

In certain implementations, technology commercialization can be part of the process of implementing the disclosed technology for a particular area. For example, a commercialization path can be developed by evaluating the results from validation. The commercialization path can include evaluating the cost effectiveness of system-wide deployment versus retrofit to existing systems, market software applications, device control algorithms, and support infrastructure requirements. Paths for participation in technology deployment by additional entities can be identified (e.g., under the requirement they follow interoperability standards defined for the various components of the system).

IV. Concluding Remarks

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments.

In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. We therefore claim all that comes within the scope and spirit of these claims and their equivalents.

What is claimed is:

1. A method for operating an area controller configured to coordinate the distribution of electricity to and from multiple feeder networks of an area, the method comprising, by computing hardware:
   monitoring a system frequency at the area;
   receiving first power reference values set by a system-wide Balancing Authority (BA);
   receiving second power reference values set by a real-time area management system;
   computing a power flow reference value indicative of an inter-area power flow, based at least in part on measured area real and reactive power, the first power reference values, and the second power reference values;
   computing an area control error based at least in part on the system frequency and the power flow reference value; and
   controlling one or more electrical generators in the area to adjust their supply and thereby reduce the area control error.

2. The method of claim 1, wherein the method further comprises transmitting the power flow reference value to controllers of the multiple feeder networks.

3. The method of claim 1, wherein the power flow reference value is based on one or more of: (a) differences between the measured area real and reactive power and the first power reference values; or (b) differences between the measured area real and reactive power and the second power reference values, which are for a current cleared time interval of a transactive control energy market in which the area controller operates.

4. The method of claim 1, further comprising computing one or more transactive signals representing a bid for using or supplying electricity in an upcoming time interval of a transactive control energy market, the time interval being a periodic time interval that repeats at a fixed interval frequency.

5. One or more non-transitory computer-readable media storing computer-executable instructions for causing an area controller, when programmed thereby, to perform balancing operations to coordinate the distribution of electricity to and from multiple feeder networks of an area of a power system, the balancing operations comprising, with computing hardware of the area controller:
   during participation in a transactive control energy market that has time intervals with a first frequency, repeatedly, at a second frequency faster than the first frequency:
      monitoring a system frequency at the area;
      computing a power flow reference value, indicative of an inter-area power flow;
      computing an area control error based at least in part on the system frequency and the power flow reference value; and
      controlling one or more electrical generators in the area to adjust their supply and thereby reduce the area control error and improve stability of the power system.

6. The one or more computer-readable media of claim 5, wherein the balancing operations further comprise transmitting the power flow reference value to controllers of the multiple feeder networks.

7. The one or more computer-readable media of claim 5, wherein the power flow reference value is based on one or more of: (a) differences between measured area real and reactive power and power reference values set by a system-wide Balancing Authority (BA); or (b) differences between measured area real and reactive power and power reference values for a current cleared time interval of the transactive control energy market.

8. The one or more computer-readable media of claim 5, further comprising computer-executable instructions for causing the area controller, when programmed thereby, to perform bidding operations that comprise computing one or more transactive signals representing a bid for using or supplying electricity in an upcoming time interval of the transactive control energy market.

9. An area controller comprising computing hardware, wherein the area controller is configured to perform balancing operations to coordinate the distribution of electricity to and from multiple feeder networks of an area in parallel with a transactive control energy market in which the area controller operates, the balancing operations comprising:
   monitoring a system frequency at the area;
   receiving first power reference values for balancing a power system that includes the area;
   receiving second power reference values for a current cleared time interval of the transactive control energy market;
   computing a power flow reference value indicative of an inter-area power flow, based at least in part on measured area real and reactive power, the first power reference values, and the second power reference values;
   computing an area control error based at least in part on the system frequency and the power flow reference value; and controlling one or more electrical generators in the area to adjust their supply and thereby reduce the area control error.

10. The area controller of claim 9, wherein the balancing operations further comprise transmitting the power flow reference value to controllers of the multiple feeder networks.

11. The area controller of claim 9, wherein the power flow reference value is based on one or more of: (a) differences between the measured area real and reactive power and the first power reference values, which are set by a system-wide Balancing Authority (BA); or (b) differences between the measured area real and reactive power and the second power reference values.

12. The area controller of claim 9, wherein the area controller is further configured to compute one or more transactive signals representing a bid for using or supplying electricity in an upcoming time interval of the transactive control energy market.

13. A method for operating an area controller configured to coordinate the distribution of electricity to and from multiple feeder networks of an area, comprising:
by computing hardware:
monitoring a system frequency at the area;
computing a power flow reference value, indicative of an inter-area power flow, based on a weighted sum of: (a) differences between measured area real and reactive power and power reference values set by a system-wide Balancing Authority (BA); and (b) differences between the measured area real and reactive power and power reference values for a current cleared time interval of a transactive control energy market in which the area controller operates, wherein (a) is weighted more heavily during contingencies and (b) is weighted more heavily during normal operation;
computing an area control error based at least in part on the system frequency and the power flow reference value; and
controlling one or more electrical generators in the area to adjust their supply and thereby reduce the area control error.

14. A method for operating a feeder controller configured to coordinate the distribution of electricity to and from multiple electrical devices coupled to a feeder controlled by the feeder controller, comprising, by computing hardware:
monitoring a system frequency at the feeder;
computing a feeder power reference value based on a weighted sum of: (a) differences between measured feeder real and reactive power and power reference values set by an area controller; and (b) differences between the measured feeder real and reactive power and power reference values for the feeder for a current cleared time interval of a transactive control energy market in which the feeder controller operates, wherein (a) is weighted more heavily during contingencies and (b) is weighted more heavily during normal operation;
computing a feeder control error based at least in part on the system frequency and the feeder power reference value;
computing one or more setpoints for one or more electrical devices coupled to the feeder, the setpoints being configured to adjust performance of the one or more electrical devices and thereby reduce the feeder control error; and
transmitting the one or more setpoints to controllers for the one or more electrical devices.

15. One or more non-transitory computer-readable media storing computer-executable instructions for causing an area controller, when programmed thereby, to perform operations to coordinate the distribution of electricity to and from multiple feeder networks of an area, the operations comprising, with computing hardware of the area controller:
monitoring a system frequency at the area;
computing a power flow reference value, indicative of an inter-area power flow, based on a weighted sum of: (a) differences between measured area real and reactive power and power reference values set by a system-wide Balancing Authority (BA); and (b) differences between the measured area real and reactive power and power reference values for a current cleared time interval of a transactive control energy market in which the area controller operates, wherein (a) is weighted more heavily during contingencies and (b) is weighted more heavily during normal operation;
computing an area control error based at least in part on the system frequency and the power flow reference value; and
controlling one or more electrical generators in the area to adjust their supply and thereby reduce the area control error.

16. An area controller comprising computing hardware, wherein the area controller is configured to perform operations to coordinate the distribution of electricity to and from multiple feeder networks of an area, the operations comprising:
monitoring a system frequency at the area;
computing a power flow reference value, indicative of an inter-area power flow, based on a weighted sum of: (a) differences between measured area real and reactive power and power reference values set by a system-wide Balancing Authority (BA); and (b) differences between the measured area real and reactive power and power reference values for a current cleared time interval of a transactive control energy market in which the area controller operates, wherein (a) is weighted more heavily during contingencies and (b) is weighted more heavily during normal operation;
computing an area control error based at least in part on the system frequency and the power flow reference value; and
controlling one or more electrical generators in the area to adjust their supply and thereby reduce the area control error.

17. One or more non-transitory computer-readable media storing computer-executable instructions for causing a feeder controller, when programmed thereby, to perform operations to coordinate the distribution of electricity to and from multiple electrical devices coupled to a feeder controlled by the feeder controller, the operations comprising, with computing hardware of the feeder controller:
monitoring a system frequency at the feeder;
computing a feeder power reference value based on a weighted sum of: (a) differences between measured feeder real and reactive power and power reference values set by an area controller; and (b) differences between the measured feeder real and reactive power and power reference values for the feeder for a current cleared time interval of a transactive control energy market in which the feeder controller operates, wherein (a) is weighted more heavily during contingencies and (b) is weighted more heavily during normal operation;

computing a feeder control error based at least in part on the system frequency and the feeder power reference value;

computing one or more setpoints for one or more electrical devices coupled to the feeder, the setpoints being configured to adjust performance of the one or more electrical devices and thereby reduce the feeder control error; and transmitting the one or more setpoints to controllers for the one or more electrical devices.

* * * * *